(12) United States Patent    (10) Patent No.: US 8,018,931 B2
Yamauchi et al.    (45) Date of Patent: Sep. 13, 2011

(54) COMMUNICATION APPARATUS AND INTEGRATED CIRCUIT FOR COMMUNICATION

(75) Inventors: Shinichiro Yamauchi, Osaka (JP); Akio Takeuchi, Osaka (JP); Atsushi Ishiwata, Osaka (JP)

(73) Assignee: Panasonic Corporation, Osaka (JP)

( * ) Notice: Subject to any disclaimer, the term of this patent is extended or adjusted under 35 U.S.C. 154(b) by 623 days.

(21) Appl. No.: 12/118,189

(22) Filed: May 9, 2008

(65) Prior Publication Data

US 2008/0310411 A1    Dec. 18, 2008

(30) Foreign Application Priority Data

May 9, 2007 (JP) ................................. 2007-124921

(51) Int. Cl.
*H04L 12/56* (2006.01)
(52) U.S. Cl. ......... 370/389; 370/392; 370/428; 709/231
(58) Field of Classification Search .................. 370/252, 370/389, 392, 428, 473, 474; 709/231, 236, 709/246; 714/48, 52, 799
See application file for complete search history.

(56) References Cited

U.S. PATENT DOCUMENTS

| | | | | |
|---|---|---|---|---|
| 5,689,509 A | * | 11/1997 | Gaytan et al. | 370/396 |
| 6,088,360 A | * | 7/2000 | Amaral et al. | 370/412 |
| 6,963,586 B2 | * | 11/2005 | Henriksson et al. | 370/469 |
| 7,835,406 B2 | * | 11/2010 | Oran et al. | 370/522 |
| 7,843,968 B2 | | 11/2010 | Okamoto et al. | |
| 2005/0141534 A1 | | 6/2005 | Kawabata et al. | |
| 2006/0251176 A1 | * | 11/2006 | Hatabu et al. | 375/240.27 |
| 2007/0016562 A1 | | 1/2007 | Cooper | |
| 2007/0127424 A1 | * | 6/2007 | Kwon et al. | 370/338 |

FOREIGN PATENT DOCUMENTS

| | | |
|---|---|---|
| JP | 2001-268159 | 9/2001 |
| JP | 2004-153471 A | 5/2004 |
| JP | 2005-167965 A | 6/2005 |

OTHER PUBLICATIONS

Japanese Office Action issued in Japanese Patent Application No. JP 2007-124921 dated May 31, 2011.

* cited by examiner

*Primary Examiner* — Hassan Phillips
*Assistant Examiner* — Duc T Duong
(74) *Attorney, Agent, or Firm* — McDermott Will & Emery LLP

(57) ABSTRACT

A communication apparatus including a storage circuit that generates verification data in one-to-one correspondence with block data which is data having a first size, and stores each pair of verification data and block data in areas having a second size in an external memory; a packet control unit that includes a CPU which executes a program to, for each piece of verification data stored by the storage circuit, generate a piece of header information including the verification data, and perform control to transmit a piece of packet data including the generated piece of header information and the piece of block data corresponding to the piece of verification data included in the generated piece of header information; and a network unit operable to sequentially transmit each piece of packet data according to the control performed by the packet control unit, wherein the storage circuit and the CPU operate in parallel.

15 Claims, 29 Drawing Sheets

FIG. 20

| | LOGICAL ADDRESS VALUE 2001 | PHYSICAL ADDRESS VALUE 2002 |
|---|---|---|
| SECOND AREA 312 OF PACKET DATA AREA 910A | 1 | 10001 |
| | ... | ... |
| | 256 | 10256 |
| FIRST AREA 311 OF PACKET DATA AREA 910A | 257 | 10257 |
| | ... | ... |
| | 2304 | 12304 |
| SECOND AREA 312 OF PACKET DATA AREA 910B | 2305 | 16001 |
| | ... | ... |
| | 2560 | 16256 |
| | ... | ... |

(table id 2000)

COMMUNICATION APPARATUS AND INTEGRATED CIRCUIT FOR COMMUNICATION

BACKGROUND OF THE INVENTION

1. Field of the Invention

The present invention relates to technology for processing to send video data, audio data, etc. over a network.

2. Description of the Related Art

In recent years, it has become comparatively easy to transfer multimedia data such as video data and audio data using a network, for example by transmitting video data taken with a camera to a terminal connected to a network, and playing back the received video data on the terminal.

Generally, processing to send the video data taken with the camera is performed by a control program executed by the camera, as described below.

First, when encoded data constituted from video data that has been compression encoded on a frame-by-frame basis according to MPEG (Moving Picture Experts Group) standard or the like is stored in a storage area in the camera, the stored encoded data is read and copied to another storage area that is different from the storage area that stored the encoded data.

The encoded data is copied to another storage area so that encoded data to be stored subsequently can be stored while transmission processing is performed on the packet data in parallel, as described later.

Next, for each predetermined size portion of the encoded data copied to the other storage area, a checksum is calculated, header information including the calculated checksum is generated, packet data is generated that includes the generated header information and the predetermined size of encoded data corresponding to the checksum, and the packet data is transmitted.

In this way, during send processing of the video data, since the encoded data is copied in the storage area, if the size of the encoded data is large due to the compression rate, etc., copying the encoded data takes more time, and the send processing time for each piece of encoded data increases.

Meanwhile, when sending video data, there is a need to send each piece of encoded data in a predetermined time period in accordance with a frame rate determined in advance by standards, etc., since if sending the piece of encoded data in the predetermined time period according to the frame rate is not possible, so-called jumpiness occurs, and the receiver of the sent video data cannot continuously play back the video.

As described above, send processing of large sized encoded data is time consuming, and high-speed send processing of each piece of the encoded data is necessary for sending the video data without jumpiness occurring.

As technology for high-speed send processing, a method is known in which send processing that is performed by the control program (software) in the above description is realized entirely with hardware (for example, Japanese Patent Application Publication No. 2001-268159, which is hereinafter referred to as "patent document 1".)

Realizing send processing entirely with hardware enables suppressing the overhead of processing that occurs when send processing is realized with software.

However, in general, when send processing is realized entirely with hardware, the initial cost of manufacture increases.

SUMMARY OF INVENTION

The present invention was achieved in view of the above issue, and an object thereof is to provide a communication apparatus that is suitable for use with a camera, etc., and can realize high-speed send processing of multimedia data while suppressing the initial cost of manufacture.

The object of the present invention is achieved by a communication apparatus that sequentially transmits a plurality of pieces of packet data over a network, each piece of packet data including a piece of block data, the communication apparatus including a storage circuit operable to (i) generate a plurality of pieces of verification data in one-to-one correspondence with the plurality of pieces of block data, each piece of verification data reflecting content of the corresponding piece of block data which is data having a first size, and (ii) store each pair of a piece of verification data and a corresponding piece of block data in a different one of a plurality of areas having a second size in an external memory; a packet control unit that includes a CPU and is operable to cause the CPU to execute a program to, for each piece of block data stored in the external memory by the storage circuit, read the piece of verification data corresponding to the piece of block data, generate a piece of header information including the read piece of verification data, and perform control to transmit a piece of packet data including the generated piece of header information and the piece of block data corresponding to the piece of verification data included in the generated piece of header information, and a network unit operable to sequentially transmit each piece of packet data according to the control performed by the packet control unit, wherein the storage circuit that generates the plurality of pieces of verification data and stores the plurality of pieces of verification data and the corresponding plurality of pieces of block data and the CPU that executes the program for generating the plurality of pieces of header information and performing control to sequentially transmit each piece of packet data operate in parallel.

Also, the object of the present invention is achieved by a communication integrated circuit that sequentially transmits a plurality of pieces of packet data over a network, each piece of packet data including a piece of block data, the communication integrated circuit including a storage circuit operable to (i) generate a plurality of pieces of verification data in one-to-one correspondence with the plurality of pieces of block data, each piece of verification data reflecting content of the corresponding piece of block data which is data having a first size, and (ii) store each pair of a piece of verification data and a corresponding piece of block data in a different one of a plurality of areas having a second size in an external memory; a packet control unit that includes a CPU and is operable to cause the CPU to execute a program to, for each piece of block data stored in the external memory by the storage circuit, read the piece of verification data corresponding to the piece of block data, generate a piece of header information including the read piece of verification data, and perform control to transmit a piece of packet data including the generated piece of header information and the piece of block data corresponding to the piece of verification data included in the generated piece of header information, a network unit operable to sequentially transmit each piece of packet data according to the control performed by the packet control unit, wherein the storage circuit that generates the plurality of pieces of verification data and stores the plurality of pieces of verification data and the corresponding plurality of pieces of block data and the CPU that executes the program for generating the plurality of pieces of header information and performing control to sequentially transmit the packet data operate in parallel.

Here, the areas having the second size are storage areas of a predetermined size that have contiguous address values in the external memory.

Also, operating in parallel means that processing in which verification data is generated by the storage circuit and stored along with the piece of block data corresponding to the piece of verification data, and processing in which the CPU generates the piece of header information and performs control to transmit the piece of packet data, are executed at least partially at the same time.

According to the above structure, the communication apparatus and the integrated circuit for communication pertaining to the present invention include the CPU and the storage circuit that is a separate piece of hardware. The storage circuit generates a piece of verification data in correspondence with each piece of the block data, and stores the generated pieces of verification data and the corresponding pieces of block data in the external memory. Meanwhile, by executing the program, for each piece of block data that the storage circuit has stored in the external memory, the CPU generates the header information including the corresponding piece of verification data, and performs control to send the piece of packet data. Parallel operation of the storage circuit and the CPU enables performing high-speed sending of packet data pieces.

Also, since send processing of packet data is performed partially by a storage circuit that is hardware, the initial cost of manufacturing the communication apparatus can be suppressed over a case of realizing send processing entirely with hardware.

Also, in the communication apparatus, first areas that are the areas having the second size in the external memory may be arranged at an address value interval that is a sum of the second size and a predetermined value, and the program may be for, for each piece of block data stored in the first area, reading the piece of verification data corresponding to the piece of block data, generating the piece of header information, storing the piece of header information in a second area which is an area that is contiguous to the first area and is a same size as the predetermined value, and performing control to sequentially transmit the piece of packet data including the piece of header information stored in the second area and the piece of block data corresponding to the piece of verification data stored in the first area.

According to this structure, since the piece of header information and the piece of block data that constitute the piece of packet data are stored in contiguous areas in the external memory, the network unit can read the piece of header information and the piece of block data from the external memory at a higher speed, and thus higher speed transmission of the packet data pieces can be performed than when the piece of header information and the piece of block data are stored in areas of the external memory that are separated from each other.

Also, the communication apparatus may further include an address control unit operable to ensure a plurality of packet data areas, each including a first area that is a free one of the areas having the second size in the external memory and a second area that is contiguous with the first area and is a predetermined address value worth of area, and designate a plurality of address values indicating the packet data areas in one-to-one correspondence, wherein the storage circuit may store each pair of the piece of block data and the corresponding piece of verification data in a different one of the first areas of the packet data areas indicated by the address value designated by the address control unit, and the program may be for, for each packet data area indicated by the address value designated by the address control unit, reading the piece of verification data corresponding to the piece of block data, generating the piece of header information, storing the piece of header information in the second area, and performing control to sequentially transmit the piece of packet data including the generated piece of header information and the piece of block data stored in the packet data area.

According to this structure, since the packet data areas are arranged in areas indicated by arbitrary address values designated by the address control unit in the external memory, the pieces of encoded data can be transmitted without ensuring physically contiguous areas for arranging the packet data areas contiguously in the external memory.

Also, the communication apparatus may further comprise an address control unit operable to ensure a plurality of packet data areas, each including a first area that is a free one of the areas having the second size in the external memory and a second area that is contiguous with the first area and is a predetermined address value worth of area, and designate a plurality of address values indicating the packet data areas in one-to-one correspondence; an offset control unit operable to, for each address value designated by the address control unit, store a subsequently designated address value in the second area of the packet data area indicated by the each address value, wherein the storage circuit, for each second area of the packet data areas, may store the piece of block data and the piece of verification data corresponding to the piece of block data in the first area of the packet data area indicated by the address value stored in the second area, and the program may be for, for each packet data area indicated by the address value stored in the second area of the packet data area, reading the piece of verification data stored in the first area, generating the piece of header information, storing the piece of header information in the second area, and performing control to sequentially transmit the piece of packet data including the piece of header information and the piece of block data stored in the packet data area.

According to this structure, since the offset control unit stores, in the second area of each packet data area, the address value that indicates the packet data area to be accessed next, even if the packet data areas are arranged in areas indicated by arbitrary address values in the external memory, the storage circuit and the CPU can access the packet data areas by referencing the address values stored in the second areas.

Also, the communication apparatus may further comprise an MMU (Memory Management Unit) operable to store a logical address value in correspondence with a physical address value indicating a free area in the external memory, and convert the logical address value to the corresponding physical address value if an access to the external memory designates the logical address value, wherein the storage circuit may designate a logical address value when storing the piece of block data and the piece of verification data corresponding to the piece of block data in the area having the second size, and the program may be further for designating the logical address value when reading the piece of verification data from the area having the second size.

According to this structure, when the storage circuit and the CPU designate a logical address value and access an area having the second size, the MMU converts the logical address value to a physical address value corresponding to the logical address value, thereby enabling the storage circuit and the CPU to access the area having the second size without knowing the physical location thereof.

The communication apparatus may further comprise an encoded data storage unit operable to, upon receiving an input of encoded data constituted from video or audio data that has been compression encoded in predetermined units, store the encoded data in the external memory; and a length monitoring unit that monitors a size of the encoded data stored in the external memory by the encoded data storage unit, and each time a first size worth of the encoded data is stored, transmits a read instruction signal that instructs the storage circuit to read the first size worth of the encoded data, wherein each piece of the block data may be a different first size worth of the encoded data read from the external memory each time the storage circuit receives the read instruction signal from the length monitoring unit.

According to this structure, every time a first size worth of encoded data is stored, the storage circuit can perform processing on the first size worth of encoded data as one piece of block data without waiting for the encoding unit to entirely complete storage of the encoded data, thus eliminating unnecessary waiting time and enabling high-speed sending of the encoded data.

Also, the communication apparatus may further comprise a pattern monitoring unit operable to, upon receiving an input of encoded data constituted from video data or audio data that has been compression encoded in predetermined units, (i) store the encoded data in the external memory, (ii) detect a predetermined bit pattern in the encoded data during storage, and (iii) for each detected predetermined bit pattern, transmit a detection signal to the storage circuit indicating that the predetermined bit pattern has been detected, wherein upon receiving the detection signal from the pattern monitoring unit, the storage circuit may read the encoded data stored in the external memory until reception of a next detection signal, and process the read encoded data as a piece of block data.

According to this structure, the pattern monitoring unit detects when encoded data having the predetermined bit pattern is stored in the external memory, thus enabling detecting the predetermined bit pattern without increasing the load on the CPU. Also, when the storage circuit receives a detection signal, the storage circuit processes, as a piece of block data, the encoded data that includes the predetermined bit pattern and was stored after the previously received detection signal including the predetermined bit pattern, thus enabling handling a case in which packet data must be sent for each predetermined bit pattern (resynchronization marker), as in MPEG-4 for RTP transmission, etc.

Also, in the communication apparatus, the pattern monitoring unit, upon detecting the predetermined bit pattern in the encoded data, may store the encoded data after the detected bit pattern in an area whose start is a predetermined address boundary in the external memory.

According to this structure, if a predetermined byte number boundary is, for example, a 4-byte boundary, when the pattern monitoring unit detects the predetermined bit pattern, the encoded data after the predetermined bit pattern is stored in the area that starts with the 4-byte boundary in the external memory, thus ensuring byte alignment.

Also, the communication apparatus may further comprise a header assignment circuit operable to, in place of the packet control unit, for each piece of block data stored in the external memory by the storage circuit, read the piece of verification data corresponding to the piece of block data, and generate the piece of header information including the read piece of verification data; and a transmission control unit that includes a CPU and is operable to cause the CPU to execute a program to, for each piece of header information generated by the header assignment circuit, perform control to transmit the piece of packet data including the piece of header information generated by the header assignment circuit and the piece of block data corresponding to the piece of verification data included in the header information.

According to this structure, since the header information is generated by the header assignment circuit, the CPU of the packet control unit does not need to generate the header information, thereby reducing the load on the CPU.

Also, in the communication apparatus, the header assignment circuit may generate each piece of header information by selecting an arbitrary header for each layer in a protocol hierarchy used in data transmission.

According to this structure, since the header assignment unit generates the header information by selecting an arbitrary header for each layer, header information can be generated in accordance with the protocol used by the communication apparatus.

Also, the communication apparatus may further comprise a header assignment circuit that, in place of the header information, for each piece of block data stored by the storage circuit in the external memory, generates a piece of partial header information which is a portion of header information that can be generated without use of the piece of verification data; and a transmission control unit that includes a CPU and is operable to cause the CPU to execute a program to, for each piece of block data stored in the external memory by the storage circuit, read the piece of verification data corresponding to the piece of block data, generate a piece of header information including the read piece of verification data and the piece of partial header information corresponding to the piece of block data, and perform control to transmit the packet data including the piece of header information and the piece of block data corresponding to the piece of verification data.

According to this structure, the load on the CPU can be reduced, since the header assignment circuit generates partial header information that can be generated without use of the verification data, and the CPU of the packet control unit, by executing a program, generates header information with use of the partial header information generated by the header assignment circuit.

Also, in the communication apparatus, the storage circuit may generate the plurality of pieces of verification data, each piece of verification data reflecting content of the corresponding piece of block data and the piece of partial header information corresponding to the block data.

Also, the communication apparatus may further comprise an encoding setting unit operable to designate a data size of encoded data for compression encoding video or audio data in predetermined units to constitute encoded data; and an encoding unit operable to, upon receiving an input of the video or audio data, compression encode the video or audio data in predetermined units in accordance with the data size designated by the encoding setting unit, and store the encoded data in the external memory.

According to this structure, since the encoding unit compression encodes the video or audio data in predetermined units in the data size designated by the encoding setting unit, for example if the encoding setting unit designates the data size in accordance with the transmission speed of the network, there is an increased possibility that the encoded data can be transmitted in accordance with a frame rate determined by standards, etc., thereby enabling suppressing occurrences of so-called jumpiness.

Also, in the communication apparatus, the external memory may have a first network data area and a second network data area that are logically divided from each other, and the plurality of areas having the second size may be alternately arranged in the first network data area and the second network data area each time an input is received of encoded data constituted from video or audio data that has been compression encoded in predetermined units.

According to this structure, when the areas having the second size that pertain to one piece of encoded data are arranged in the first network data area, the areas having the second size that pertain to the subsequent piece of encoded data are arranged in the second network data area. This enables facilitating, comparatively, flow control so that block data that has not yet been transmitted as packet data is not overwritten by the piece of block data and the corresponding piece of verification data of the subsequent piece of encoded data.

Also, in the communication apparatus, communication may be performed premised on a possibility of retransmission, the external memory may have a retransmission area that stores a piece of block data that constitutes a piece of packet data that is possibly required for retransmission, and for each piece of packet data, if a response from a transmission destination of the piece of packet data indicating that the piece of packet data has been received is not received in a predetermined time period after the network unit transmits the piece of packet data, the packet control unit may cause the CPU to execute a program that transfers the piece of block data that constitutes the piece of packet data for which the response has not been received to the retransmission area.

According to this structure, if the CPU has not received a response indicating that the packet data has been received from the sender in a predetermined time period after the transmission, by executing the program, the CPU transfers the header information and the block data that constitute the packet data, specifically the packet data that must be retransmitted, to the retransmission area in the external memory. Therefore, setting an appropriate predetermined time period enables preventing the area that stores the data constituting the packet data to be retransmitted from being rewritten when the storage circuit performs processing on the piece of encoded data that is to be stored subsequently.

Also, the object of the present invention is achieved by a communication apparatus that transmits data over a network, including a detection unit operable to generate a piece of false detection data for each predetermined size portion of the data; a data transfer unit operable to transfer the data to a predetermined storage area; a CPU operable to execute a control program to, for each predetermined size portion of the data that the data transfer unit has finished transferring to the storage area, perform control to transmit the predetermined size portion of the data and the false detection data corresponding thereto as a packet, and a network unit operable to transmit a plurality of packets over a network, wherein the detection unit, the data transfer unit, and the CPU operate in parallel.

According to this structure, since the detection unit, the data transfer unit, and the CPU perform processing in parallel, high-speed transmission of packets is possible.

BRIEF DESCRIPTION OF DRAWINGS

These and other objects, advantages, and features of the invention will become apparent from the following description thereof taken in conjunction with the accompanying drawings, which illustrate specific embodiments of the present invention.

In the drawings:

FIG. 9 illustrates a network data area 302a;

FIG. 14 illustrates a network data area 302a;

FIG. 20 shows a data structure and exemplary content of an address conversion table 2000;

DESCRIPTION OF THE PREFERRED EMBODIMENTS

Figure 1:
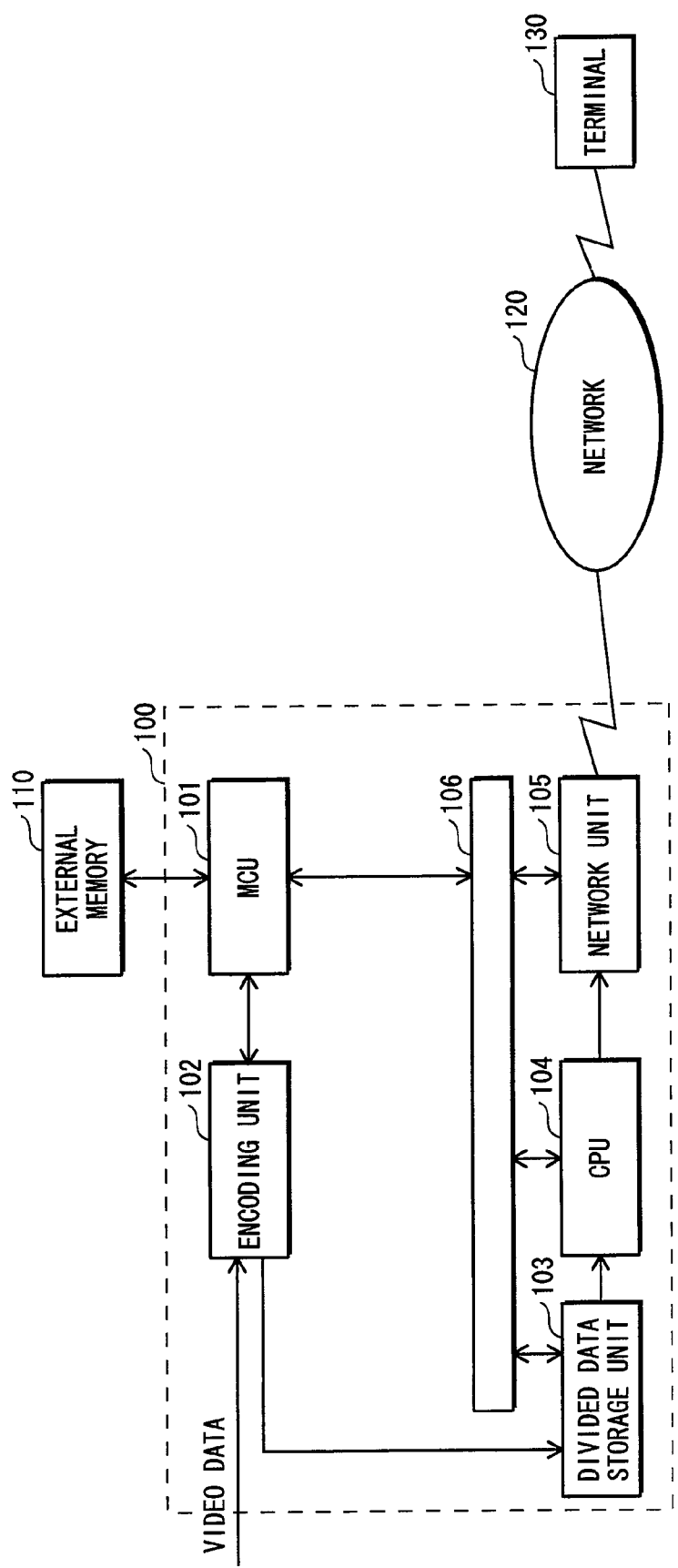
FIG. 1 shows a structure of a communication apparatus 100 pertaining to embodiment 1.

Embodiments of the present invention are described below with reference to the drawings.

Embodiment 1

Overview

The communication apparatus pertaining to embodiment 1 improves on a communication apparatus that realizes send processing of video data entirely with software, and enables higher speed send processing by realizing the send processing partially with hardware.

The description of send processing of video data performed by the communication apparatus of embodiment 1 is divided into data processing, protocol processing, and transmission processing.

First, data processing refers to, for each piece of encoded data which is video data that has been compression encoded on a frame-by-frame basis, calculating a checksum for each payload size of packet data to be transmitted, and storing the payload size of the packet data to be transmitted (hereinafter referred to as "block data") and the corresponding checksum in an area having a predetermined size (hereinafter referred to as a "first area") in a memory that is external to the communication apparatus (hereinafter referred to as an "external memory").

Here, the first areas are arranged in the external memory at an address value interval that is the sum of a predetermined value, for example 256, and the size of each first area, in other words, leaving an interval of the predetermined value free between adjacent first areas. Data constituted from a piece of block data and a checksum, in that order, is stored in each first area.

Hereinafter, an area having the size of the predetermined value is referred to as a "second area", and an area constituted from the second area and the first area that is contiguous with the second area is referred to as a "packet data area".

Next, protocol processing refers to, for each packet data area in the external memory, reading the checksum stored in the first area, generating header information that includes the read checksum, and storing the generated header information in the second area.

Next, send processing refers to, for each of the packet data areas, reading the piece of block data stored in the first area and the piece of header information stored in the second area and transmitting a piece of packet data constituted from the piece of block data and the piece of header information via a network. Note that since the checksum stored in the first area is already included in the piece of header information, the checksum is not transmitted.

In send processing of the video data, the communication apparatus pertaining to embodiment 1 causes a divided data storage unit that is specialized hardware to perform data processing, and causes a CPU (Central Processing Unit) that executes a control program to perform protocol processing and control of transmission processing.

Accordingly, this enables suppressing the initial cost of manufacturing the communication apparatus over a case of realizing send processing entirely with use of specialized hardware.

Also, causing the divided data storage unit to perform data processing that is a portion of send processing enables high-speed send processing, since the CPU can be caused to perform sequential protocol processing on data on which data processing has been completed, as soon as the data processing has been completed for such data.

Also, the divided data storage unit stores each piece of block data and the checksum thereof in the physically contiguous first areas, and the CPU stores the header information in the second areas that are contiguously arranged before the first areas.

Therefore, the pieces of block data and the pieces of header information that are necessary to generate the pieces of packet data to be ultimately transmitted are stored in contiguous areas in the external memory, thereby enabling generally higher-speed reading by a program over a case of storing the pieces of block data and the pieces of header information in distant areas in the external memory, and furthermore enabling higher speed transmission processing.

Structure

The following describes a structure of a communication apparatus 100 pertaining to embodiment 1.

FIG. 1 shows the structure of the communication apparatus 100 pertaining to embodiment 1.

As shown in FIG. 1, the communication apparatus 100 is connected to an external memory 110 that is external to the communication apparatus 100, and is also connected to a terminal 130 via a network 120.

Note that the external memory 110 is a memory that stores the encoded data, the block data, the checksum, and the header information that have been processed by the communication apparatus 100, and in the following description, the size of each address portion in the external memory 110 is one byte, and the size of data that the external memory 110 transmits at one time, in other words, the bus width of the external memory 110, is 4 bytes.

Also, the network 120 is a LAN (Local Area Network) or a WAN (Wide Area Network). The terminal 130 is a PC (personal computer) that receives the packet data transmitted from the communication apparatus 100 and plays back a video.

As shown in FIG. 1, the communication apparatus 100 includes an MCU (Memory Control Unit) 101, an encoding unit 102, a divided data storage unit 103, a CPU 104, a network unit 105, and an internal bus 106.

The MCU 101 is a general arbiter circuit that performs arbitration so that competition does not occur when accessing the external memory 110, and such arbitration is performed for access to the external memory 110 by the encoding unit 102, the divided data storage unit 103, the CPU 104, and the network unit 105.

The encoding unit 102 is a general compression encoding circuit that converts frame-by-frame video data input from an external source according to MJPEG (Motion Joint Photographic Experts Group) standard, MPEG (Moving Pictures Experts Group) standard, H.264 standard, etc., stores each piece of the encoded data that has been compression encoded in a later-described encoded data area 301a or encoded data area 301b of the external memory 110 in accordance with a result of the arbitration by the MCU 101, and when the storage has been completed, transmits a notification to the divided data storage unit 103 indicating that the storage is complete.

Note that although any compression encoding method may be used, encoding according to MPEG standard is used in the following description.

The divided data storage unit 103 is a circuit that performs the data processing portion of the send processing of the video data. Here, the divided data storage unit 103 corresponds to the storage circuit in the present invention, and the same is true in all the embodiments and variations.

Figure 2:
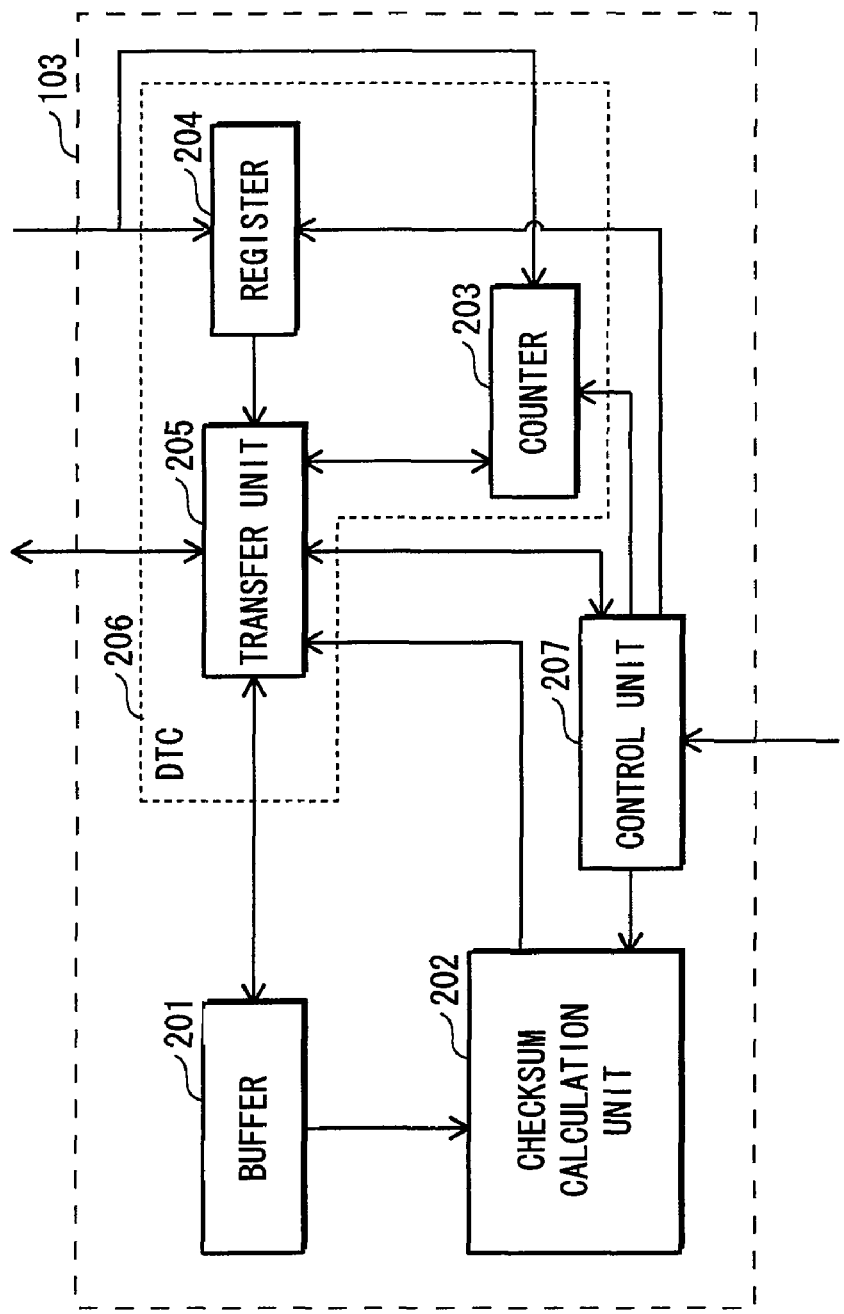
FIG. 2 shows a structure of a divided data storage unit 103.

The following describes the divided data storage unit 103 in detail with reference to FIG. 2.

FIG. 2 shows the structure of the divided data storage unit 103.

As shown in FIG. 2, the divided data storage unit 103 includes a buffer 201, a checksum calculation unit 202, a DTC (Data Transfer Controller) 206, and a control unit 207.

The buffer 201 stores encoded data read by the DTC 206 from the later-described encoded data area 301a or 301b of the external memory 110.

Specifically, since the encoded data is transmitted in pieces having a predetermined size (4 bytes) corresponding to the bus width of the external memory 110, the buffer 201 stores encoded data in pieces having the predetermined size.

Also, the buffer 201 transmits the stored encoded data to the checksum calculation unit 202 in pieces of two bytes at a time.

The checksum calculation unit 202 includes an adder, and is a circuit for performing addition on 2-byte data pieces. For each 2-byte piece of encoded data received from the buffer 201, the checksum calculation unit 202 considers the piece of encoded data as numerical values, and calculates a checksum that is a total value of all of the numerical values.

Note that when send processing of the video data starts, the later-described CPU 104 sets the checksum to zero as an initial value.

The DTC 206 is a circuit that performs transfer of data, and includes a counter 203, a register 204, and a transfer unit 205.

The counter 203 is a circuit that holds an address value (hereinafter referred to as a "read address value") that indicates a location that stores the encoded data in the later-described encoded data area 301a or 301b of the external memory 110, and an address value (hereinafter referred to as a "write address value") that indicates a location in the first area of the later-described network data area 302a or 302b to store a piece of block data and the checksum thereof.

When the video data send processing starts, the CPU 104 sets a starting address value of the encoded data area 301a as an initial value for the read address value. For the write address value, the CPU 104 sets a starting address value of the first area of the network data area 302a to be accessed first.

The read address value and the write address value are updated by the transfer unit 205 when data is transmitted. Also, when one frame worth of encoded data has been completely read from the encoded data area 301a or 301b, the control unit 207 sets a starting address value of the other encoded data area as the read address value. Specifically, if the one frame worth of encoded data has been completely read from the encoded data area 301a, the control unit 207 sets a starting address value of the encoded data area 301b as the read address value, and if the one frame worth of encoded data has been completely read from the encoded data area 30b, the control unit 207 sets a starting address value of the encoded data area 301a as the read address value.

Also, when a piece of block data and a checksum of a piece of block data have been completely stored in one of the first areas of the network data area 302a or 302b, the control unit 207 sets a starting address value of the other network data area as the write address value. Specifically, if the storage was completed in the network data area 302a, the control unit 207 sets a starting address of a first area to be accessed first in the network data area 302b as the write address value, and if the storage was completed in the network data area 302b, the control unit 207 sets a starting address of a first area to be accessed first in the network data area 302a as the write address value.

The register 204 is a circuit that holds an address value corresponding to the size of the second area, a starting address value in the network data area 301a or 301b described later, and a starting address of a first area to be accessed first in the network data area 302a or 302b, described later. These address values are set by the CPU 104, described later, when send processing of the video data starts.

The transfer unit 205 is a circuit that reads the encoded data from the external memory 110 and stores block data and checksums in the external memory 110.

Specifically, upon receiving an encoded data storage completion notification from the encoding unit 102 via the control unit 207, for every predetermined size (4 bytes) worth of encoded data in the encoded data area 301a or 301b indicated by the read address value set in the counter 203, the transfer unit 205 reads the encoded data, and stores the read encoded data in the buffer 201. Each time a predetermined size (4 bytes) of encoded data is read, the transfer unit 205 causes the read address value set in the counter 203 to be increased by 4.

Also, for every predetermined size (4 bytes), the transfer unit 205 stores the encoded data from the buffer 201 into a first area of the network data area 302a or 302b of the external memory 110 indicated by the write address value set in the counter 203, and causes the write address unit to be increased by 4.

When storage of a block data size worth of encoded data has been completed as a result of storing the predetermined size (4 bytes) of encoded data in the first area of the network data area 302a or 302b, the transfer unit 205 reads the checksum from the checksum calculation unit 202, and stores the checksum in the first area of the external memory 110 indicated by the write address value set in the counter 203.

Also, each time storage of a checksum is completed, the transfer unit 205 transmits a checksum storage completion notification to the control unit 207.

Note that the transfer unit 205 accesses the external memory 110 in accordance with the result of arbitration by the MCU 101.

The control unit 207 is a circuit that performs control on various units in the divided data storage unit 103. Specifically, upon receiving the encoded data storage completion notification from the encoding unit 102, the control unit 207 transmits the notification to the transfer unit 205.

Also, upon receiving the checksum storage completion notification from the transfer unit 205, the control unit 207 resets the value of the checksum to zero in the checksum calculation unit 202, transfers the checksum storage completion notification to the CPU 104, and causes the write address value set in the counter 203 to be increased by the address value corresponding to the size of the second area, which is held by the register 204.

The write address value is increased for arranging the first areas in the external memory 110 at an address value interval that is the sum of the size of the second area and the size of each first area, and for subsequently storing a piece of block data and the checksum of the piece of block data in the first area while leaving the area used as the second area free.

Also, when one frame worth of encoded data has been completely read from the encoded data area 301a or 301b, the control unit 207 sets a starting address value of the other encoded data area as the read address value, and when the block data and the checksum of the block data have been completely stored in one of the first areas of the network data storage area 302a or 302b, the control unit 207 sets a starting address to be accessed first in the other network data area as the write address value.

The CPU 104 is a circuit that performs protocol processing and control of the transmission processing portion of the send processing of the video data by executing the control program stored in a memory in the communication apparatus 100 that is not depicted (hereinafter referred to as an "internal memory"). The CPU 104 and the internal memory realize the functions of the packet control unit in the present invention, and the same is true in all of the embodiments and variations below.

In protocol processing, specifically, upon receiving a checksum storage completion notification from the divided data storage unit 103, by executing the control program, the CPU 104 reads the checksum stored in a first area of the external memory 110, generates header information including the read checksum, and stores the generated header information in the second area arranged before the first area in which the checksum is stored. The content of the header information is described later.

Reading the checksum stored in the each of the first areas and storing the piece of header information in each of the second areas by the control program can be realized by a method of defining a variable S of a structure whose members are, for example, a variable H indicating header information, a variable D indicating block data, and a variable C indicating a checksum; and a pointer variable A that indicates an address of the variable S.

At such a time, a starting address of a packet data area to be accessed first is set as an initial value for the pointer variable A. Accessing a checksum is possible by specifying the variable C that is a member of the structure variable S stored at the address indicated by the variable A, and accessing header information is possible by specifying the variable H that is a member of the structure variable S. Causing the variable A to increase one at a time enables each of the packet data areas to be sequentially accessed.

Also, in control of transmission processing, specifically, when generated header information is stored in a second area of the external memory 110, by executing the control program, the CPU 104 designates an address value indicating the packet data area, and transmits a transmission instruction notification for transmitting the packet data including the header information stored in the second area and the block data stored in the first area to the network unit 105.

Note that access to the external memory 110 is performed in accordance with the result of the arbitration by the MCU 101.

Also, the CPU 104 performs overall control of the communication apparatus 100 by executing the control program. Specifically, the CPU 104 sets an initial value in the checksum calculation unit 202 of the divided data storage unit 103 and the counter 203 and the register 204 of the DTC 206 when the video data send processing starts.

The network unit 105 is a general network interface, and is a circuit that reads block data stored in the first area, and the header information stored in the second area, of the packet data area indicated by the address value designated by the CPU 104, and successively transmits the read block data stored in the first area and the header information stored in the second area, as packet data, via the network 120 to the terminal 130. The content of the packet data is described later.

Note that access to the external memory 110 is performed in accordance with the result of the arbitration by the MCU 101.

The internal bus 106 is a general address bus and data bus for performing data transfer between the divided data storage unit 103, the CPU 104, the network unit 105, and the external memory 110.

Data

The following describes data used by the communication apparatus 100.

Arranging Data in the External Memory 110

First, the following describes arrangement of the data stored in the external memory 110.

Figure 3:
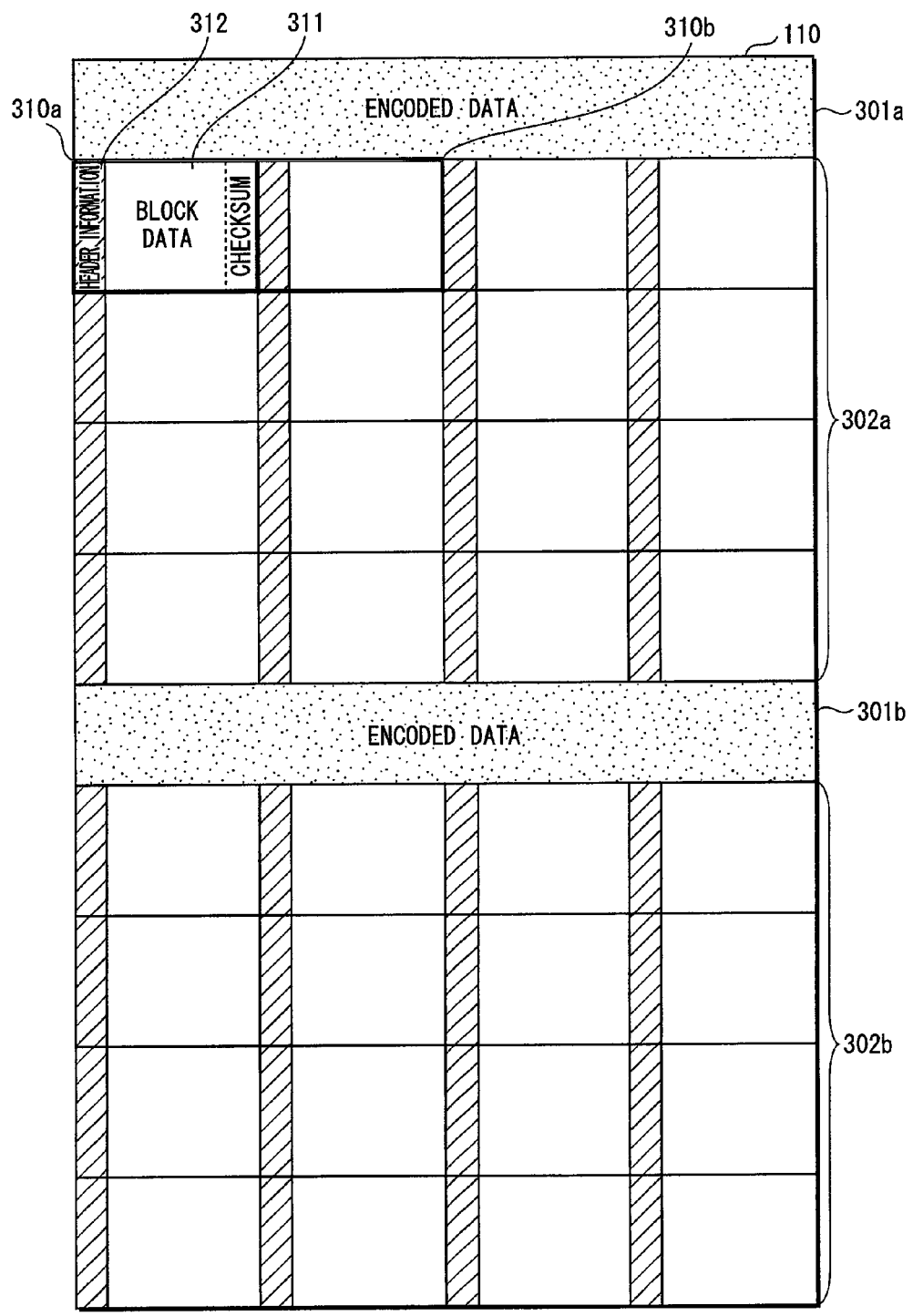
FIG. 3 illustrates a storage area of an external memory 110.

FIG. 3 shows a storage area of the external memory 110.

As shown in FIG. 3, the storage area of the external memory 110 is an area that includes the encoded data areas 301a and 301b, and the network data areas 302a and 302b.

The encoded data area 301a is a physically contiguous area that stores one frame worth of encoded data that was compression encoded to MPEG by the encoding unit 102.

The encoded data area 301b is basically the same as the encoded data area 301a, and is an area in which the encoding unit 102 stores the one frame worth of encoded data subsequent to the one frame worth of encoded data stored in the encoded data area 301a.

Specifically, the pieces of encoded data that have been compression encoded by the encoding unit 102 are stored in either the encoded data area 301a or 301b so as to alternate on a frame-by-frame basis.

The network data area 302a is a physically contiguous area that stores data that constitutes packet data to be transmitted to the network 120 and that corresponds to the one frame worth of encoded data stored in the encoded data area 301a, and as shown in FIG. 3, is further logically divided into packet data areas 310a, 310b, etc.

The network data area 302b is basically the same as the network data area 302a, and is an area for storing the data corresponding to the packet data that is one frame worth of encoded data stored in the encoded data area 301b.

Since the packet data areas 310a, 310b, etc. have the same structure, the following describes only the packet data area 310a.

The packet data area 310a is a physically contiguous area that stores data constituting one piece of packet data, and is logically divided into a first area 311 and a second area 312.

The first area 311 is an area that stores one piece of block data and a checksum of the piece of block data.

The block data is encoded data that has a payload size of the packet data, and the size of a piece of the block data is hereinafter described as being 1472 bytes, the largest payload size in UDP.

The checksum is the total value of all of the numerical values in a 2-byte piece of block data when the piece of encoded data is considered as numerical values, and the size of the checksum is two bytes.

Although the first area 311 can be any size provided that the block data (1472 bytes) and the checksum (two bytes) can be stored, the first area 311 is a 2-kilobyte area in the following description.

The second area 312 is an area that stores header information including the checksum stored in the first area 311.

Although the second area 312 can be any size provided that the header information described later (54 bytes in the example described later) can be stored, in the description below, the second area 312 is a 256-byte area.

Header Information

The following describes header information.

The header information refers to pieces of header information in Ethernet frames, and includes a checksum calculated by the divided data storage unit 103.

Figure 4:
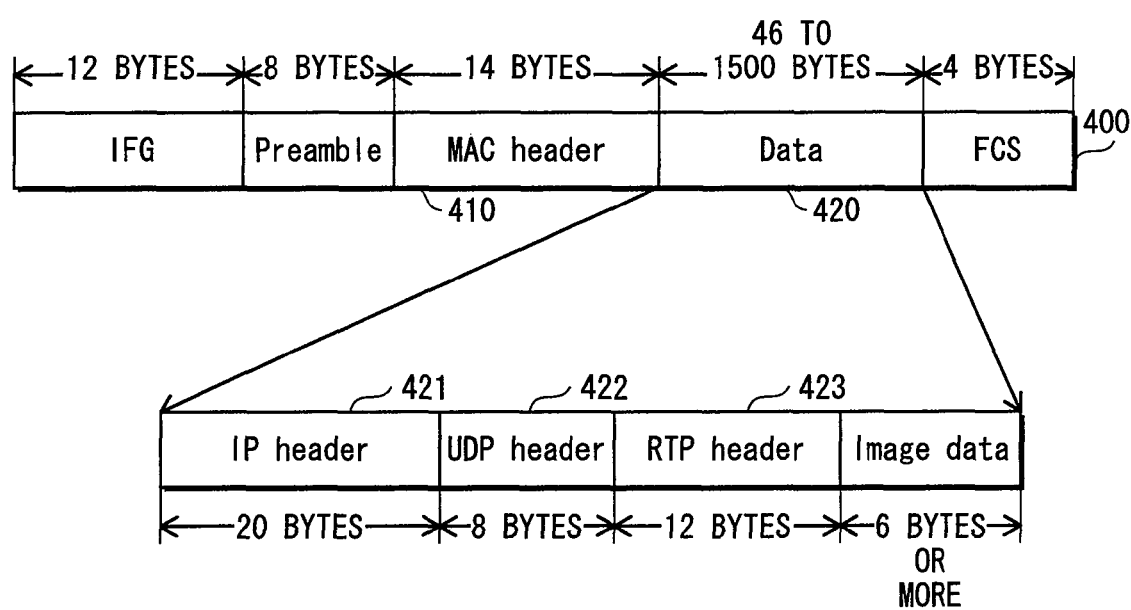
FIG. 4 illustrates a frame structure of packet data 400.

FIG. 4 shows a frame structure of packet data 400 transmitted by the network unit 105 while sending video data with use of RTP (Real-time Transport Protocol)/UDP.

The frame structure of the packet data 400 is compliant with the IEEE 802.3 standard, the UDP protocol, and the RTP protocol, and as shown in FIG. 4, the packet data 400 includes a MAC (Media Access Control) header 410 and data 420, and the data 420 further includes an IP (Internet Protocol) header 421, a UDP header 422, and an RTP header 423.

The header information is information constituted from each of four headers, namely the MAC header 410, the IP header 421, the UDP header 422, and the RTP header 423.

Since the content of each of the headers is the same as the content of each of the headers in the IEEE 802.3 standard, UDP protocol and RTP protocol, description thereof is omitted here. The checksum stored in the first area 311 is used as the checksum in the UDP header 422. Also, since the areas other than the headers are also compliant with the IEEE 802.3 standard, UDP protocol and RTP protocol, description thereof is omitted here.

Operation

The following describes the operation of the communication apparatus 100 that processes the above data and has the structure described above.

Divided Data Storage Unit

First, the operation of the divided data storage unit 103 is described.

Figure 5:
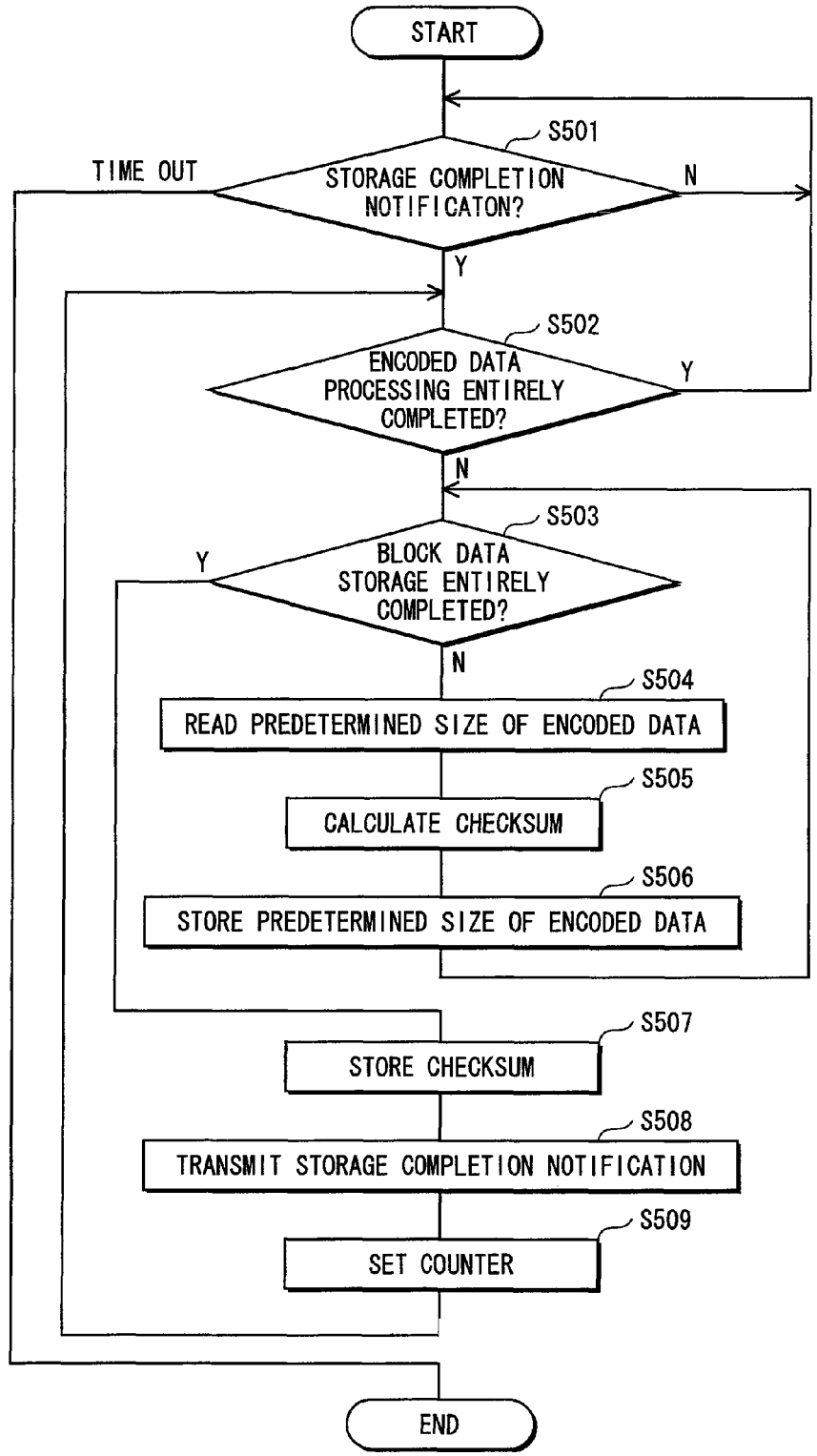
FIG. 5 is a flowchart showing processing of the divided data storage unit 103.

FIG. 5 is a flowchart showing the operation of the divided data storage unit 103.

In the following description, the encoded data is stored in the encoded data area 301*a*.

The transfer unit 205 in the DTC 206 of the divided data storage unit 103 checks whether a storage completion notification has been received from the encoding unit 102 via the control unit 207 of the divided data storage unit 103, indicating that storage of the encoded data has been completed (step S501).

If the encoded data storage completion notification has not been received (step S501:N), processing returns to step S501.

If the encoded data storage completion notification has not been received in a predetermined time period (step S501: time out), processing ends.

If the encoded data storage completion notification is received (step S501:Y), the transfer unit 205 checks whether transmission processing of the encoded data is entirely completed (step S502).

If transmission processing of the encoded data is not entirely completed (step S502:N), the transfer unit 205 checks whether storage of the block data in the first area 311 has been entirely completed (step S503).

If storage of the block data in the first area 311 has not been entirely completed (step S503:N), the transfer unit 205 reads a predetermined size (4 bytes) of encoded data to the buffer 201 of the divided data storage unit 103 from the encoded data storage area 301*a* indicated by the read address value in the counter 203 in the DTC 206 of the divided data storage area 103 (step S504).

Note that the transfer unit 205, upon reading a predetermined size (4 bytes) of encoded data, causes the counter 203 to increase the read address value by four.

The buffer 201 transmits the stored encoded data to the checksum calculation unit 202 two bytes at a time. The checksum calculation unit 202 considers each received two bytes of encoded data as numerical values, and calculates the checksum (step S505).

The transfer unit 205 stores the predetermined size (4 bytes) of encoded data, which was stored in the buffer 201, in the first area 311 in the network data area 302*a* indicated by the write address value in the counter 203 (step S506), and processing returns to step S503.

Note that the transfer unit 205, upon storing a predetermined size (4 bytes) of encoded data in the first area 311, causes the counter 203 to increase the write address value by four.

If storage of the block data has been entirely completed (step S503:Y), the transfer unit 205 reads a checksum from the checksum calculation unit 202, and stores the checksum in the first area 311 in the network data area 302*a* indicated by the write address value in the counter 203 (step S507).

When storage of the checksum has been completed, the transfer unit 205 transmits a notification to the CPU 104 via the control unit 207 indicating that storage of the checksum has been completed (step S508). Note that the control unit 207 resets the value of the checksum of the checksum operation unit 202 to zero.

The control unit 207 causes the counter 203 to increase the write address value by the value of the size of the second area 312 set in the register 204 in the DTC 206 of the divided data storage unit 103 (step S509), and processing returns to step S502.

If transfer processing of the encoded data has been entirely completed (step S502:Y), the transfer unit 205 returns to step S501.

This concludes the processing of one frame worth of encoded data.

Note that the encoded data of the next frame is stored in the encoded data area 301*b* of the external memory 110 by the encoding unit 102.

Therefore, the control unit 207 sets a starting address value of the encoded data area 301*b* stored in the register 204 for the read address value in the counter 203, and sets a starting address value of the first area 311 to be accessed first in the network data area 302*b* stored in the register 204 for the write address value in the counter 203. As a result, the transfer unit 205 reads encoded data from the encoded data storage area 301*b*, and stores the block data and the checksum of the block data in the network data area 302*b*.

CPU

The following describes the operation of the CPU 104.

Figure 6:
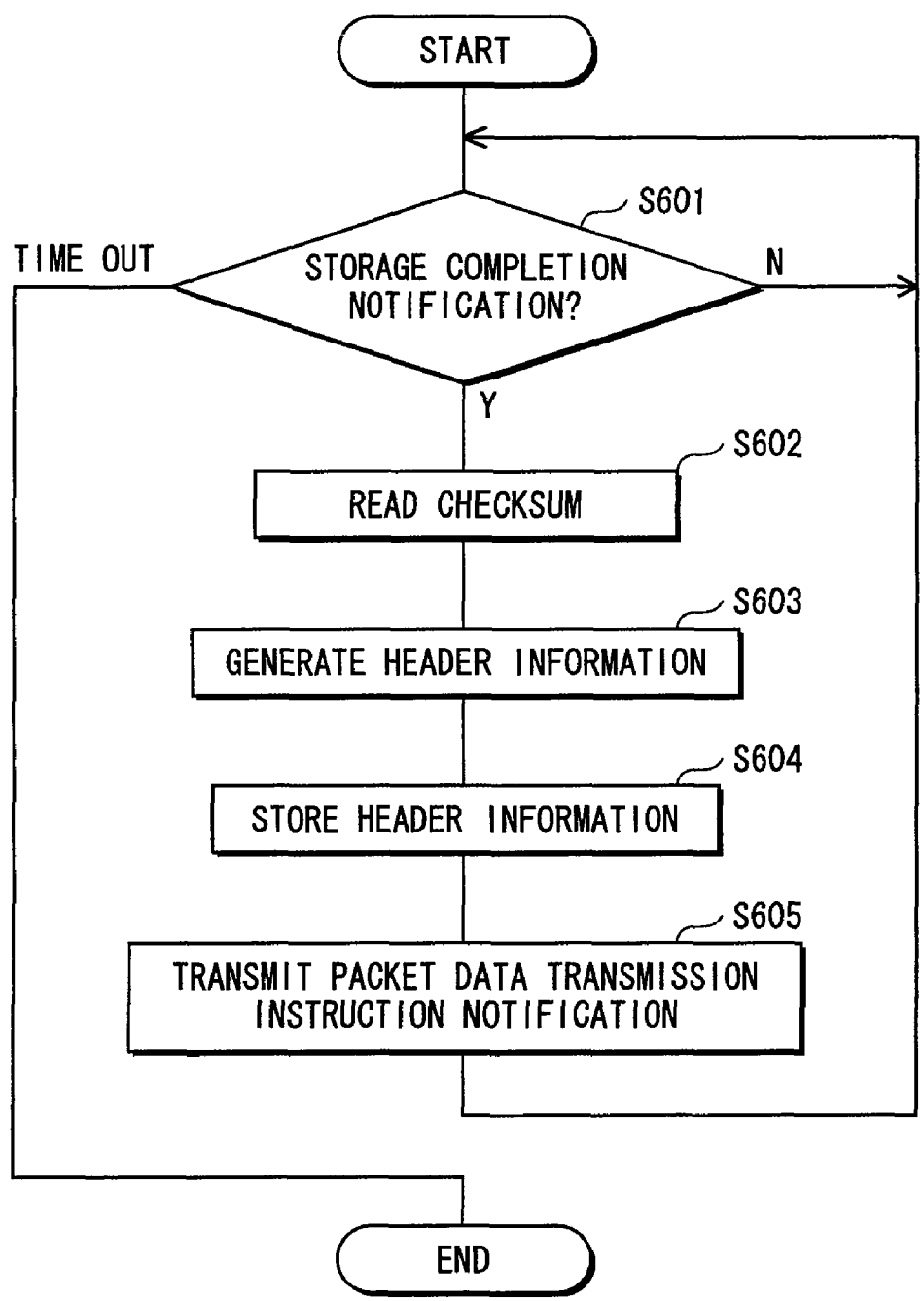
FIG. 6 is a flowchart showing processing of a CPU 104.

FIG. 6 is a flowchart showing the operation of the CPU 104.

In the following description, the block data and the checksum are stored in the network data area 302*a*.

By executing the control program, the CPU 104 checks whether a notification has been received from the divided data storage unit 103 indicating that storage of the checksum has been completed (step S601).

If the checksum storage completion notification has not been received (step S601:N), processing returns to step S601).

If the checksum storage completion notification has not been received in a predetermined time period (step S601: time out), processing ends.

If the checksum storage completion notification is received (step S601:Y), by executing the control program, the CPU 104 reads the checksum stored in the first area 311 (step S602).

By executing the control program, the CPU 104 generates header information including the read checksum (step S603).

By executing the control program, the CPU 104 stores the generated header information in the second area 312 of the packet data area that includes the read checksum (step S604).

By executing the control program, the CPU 104 designates an address value of the packet data area that stores the header information, transmits, to the network unit 105, an instruction notification to transmit the packet data constituted from the header information and the block data stored in the packet data area indicated by the designated address value (step S605), and returns to step S501.

This completes the processing performed on one piece of packet data. Processing can be performed on one frame worth of packet data by repeating the processing described above.

Note that the block data and the checksum of the next frame are stored in the network data area 302*b* by the divided data storage unit 103, and therefore the CPU 104, by executing the control program, reads the checksum from the network data area 302*b*, and stores the header information in the network data area 302*b*.

Timing Chart

Figure 7:
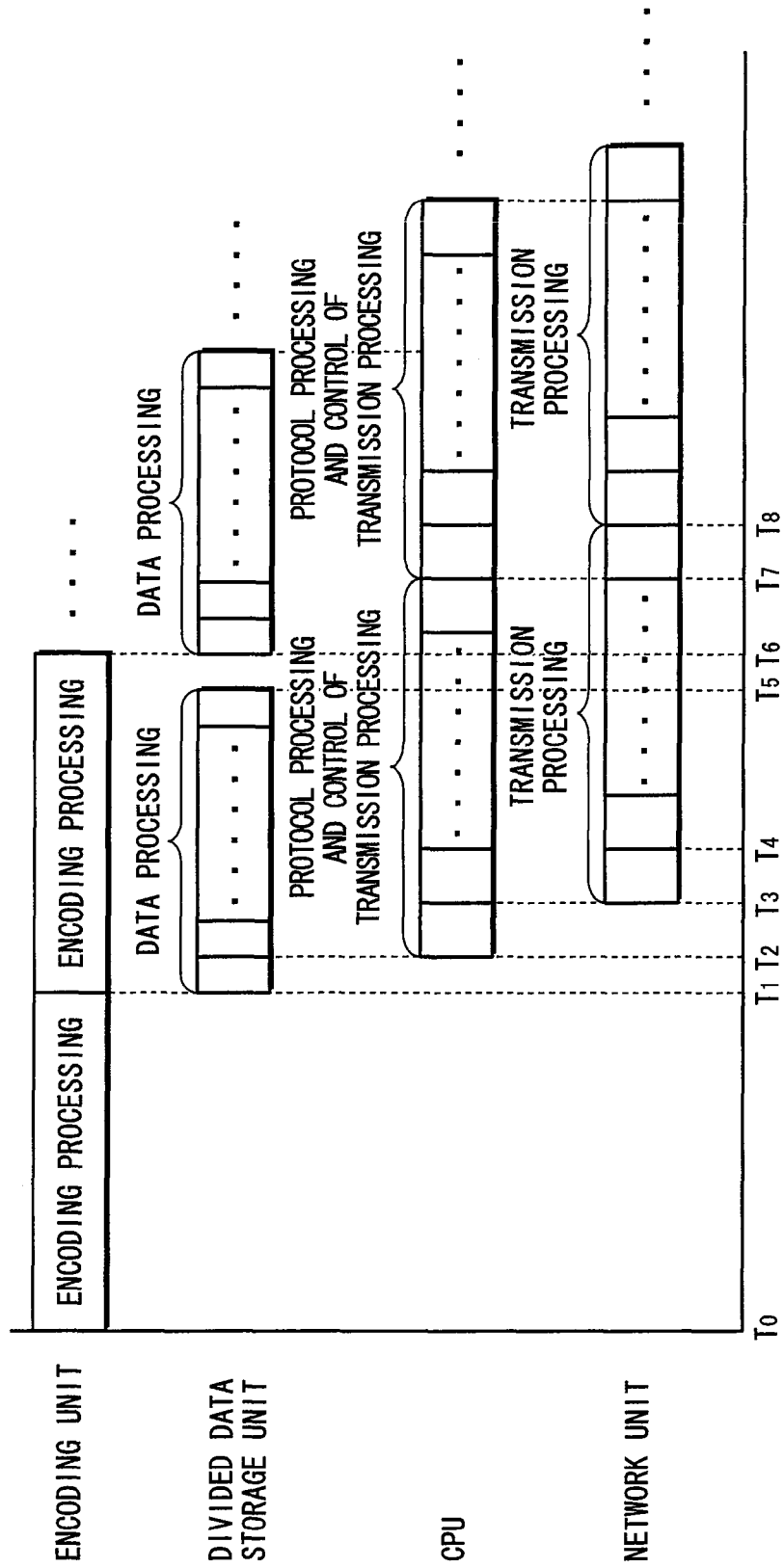
FIG. 7 is a timing chart pertaining to processing of various units in the communication apparatus 100.

The following describes the timings of operations of various units with reference to FIG. 7.

FIG. 7 is a timing chart pertaining to the operation of various units in the communication apparatus 100.

In the following description, the encoding unit 102 stores one frame worth of encoded data in the encoded data area 301a, and the divided data storage unit 103 stores the block data and the checksum in the network data area 302a.

T0 is a timing at which the encoding unit 102 starts processing.

From T0 to T1, the encoding unit 102 compression encodes one frame worth of video data input from outside the communication apparatus 100 to MPEG, and stores the encoded data in the encoded data area 301a of the external memory 110.

T1 is the timing at which the encoding unit 102 completes storage of the encoded data in the encoded data area 301a, the divided data storage unit 103 receives the encoded data storage completion notification from the encoding unit 102, and processing starts.

From T1 to T5, the divided data storage unit 103 stores checksums corresponding to each piece of block data in one piece of encoded data, according to the flowchart of FIG. 5.

T2 is the timing at which the divided data storage unit 103 completes storing a first piece of block data and the checksum thereof in the first area 311 of the packet data area 310a, the CPU 104 receives the checksum storage completion notification from the divided data storage unit 103 by executing the control program, and processing starts.

From T2 to T7, by executing the control program, the CPU 104 stores each piece of header information and performs control to transmit each piece of packet data according to the flowchart of FIG. 6.

T3 is a timing at which the CPU 104 completes storing a first piece of header information in the second area 312 of the packet data area 310a by executing the control program, the network unit 105 receives the packet data transmission instruction notification from the CPU 104, and processing starts.

From T3 to T4, the network unit 105 transmits packet data to the terminal 130 via the network 120. The packet data is constituted from block data stored in the first area 311, and header information stored in the second area 312, of the packet data area 310a indicated by the address value designated by the CPU 104. Thereafter, until T8, the same processing is repeatedly performed while the packet data area to be referenced is changed each time.

According to the above, transmission processing of the one frame worth of video data input first from outside the communication apparatus 100 is completed, and repeating the above processing enables sending all of the frames of video data.

Note that since the encoded data areas 301a and 301b and the network data areas 302a and 302b are used alternately for processing each frame worth of video data, from T1 to T6, the one frame worth of video data that is input next from outside the communication apparatus 100 is compression encoded by the encoding unit 102 and stored in the encoded data area 301b as encoded data. In processing of various units from T6 onward, the block data, the checksum and the header information are stored in the network data area 302b.

This completes the description of the operation timings of the communication apparatus 100. The following describes the time period required for data processing and protocol processing in the communication apparatus 100.

In FIG. 7, a time period for processing by the divided data storage unit 103 from T1 to T2 is referred to as "a", a time period for processing by the CPU 104 from T2 to T3 is referred to as "b", and the divided data storage unit 103 and the CPU 104 perform data processing and protocol processing, respectively, N times on each piece of encoded data.

If data processing and protocol processing are realized by causing execution of a program by one CPU, the processing time period is (a+b)×N for each piece of encoded data.

However, since the data processing and the protocol processing are performed in parallel in the communication apparatus 100, the time period for processing other than the processing from T1 to T2 is a+b×N.

Accordingly, the communication apparatus 100 can reduce the processing time period by a×(N−1) over a case in which data processing and protocol processing are realized by one CPU.

Embodiment 2

Overview

The communication apparatus 100 pertaining to embodiment 1 ensures network data areas 302a and 302b that are physically contiguous in the external memory 110, and contiguously arranges the packet data areas in the ensured network data areas 302a and 302b.

However, there are cases when ensuring physically contiguous areas in the external memory 110 is impossible due to fragmentation, etc., and cases when ensuring physically contiguous areas causes a reduction in the usage efficiency of the external memory 110.

The communication apparatus pertaining to embodiment 2 can effectively utilize the storage areas of the external memory 110 by managing the address values that indicate the packet data areas so that the packet data areas in the external memory 110 can be arranged non-contiguously.

Structure

The following describes the structure of a communication apparatus 800 pertaining to embodiment 2.

Figure 8:
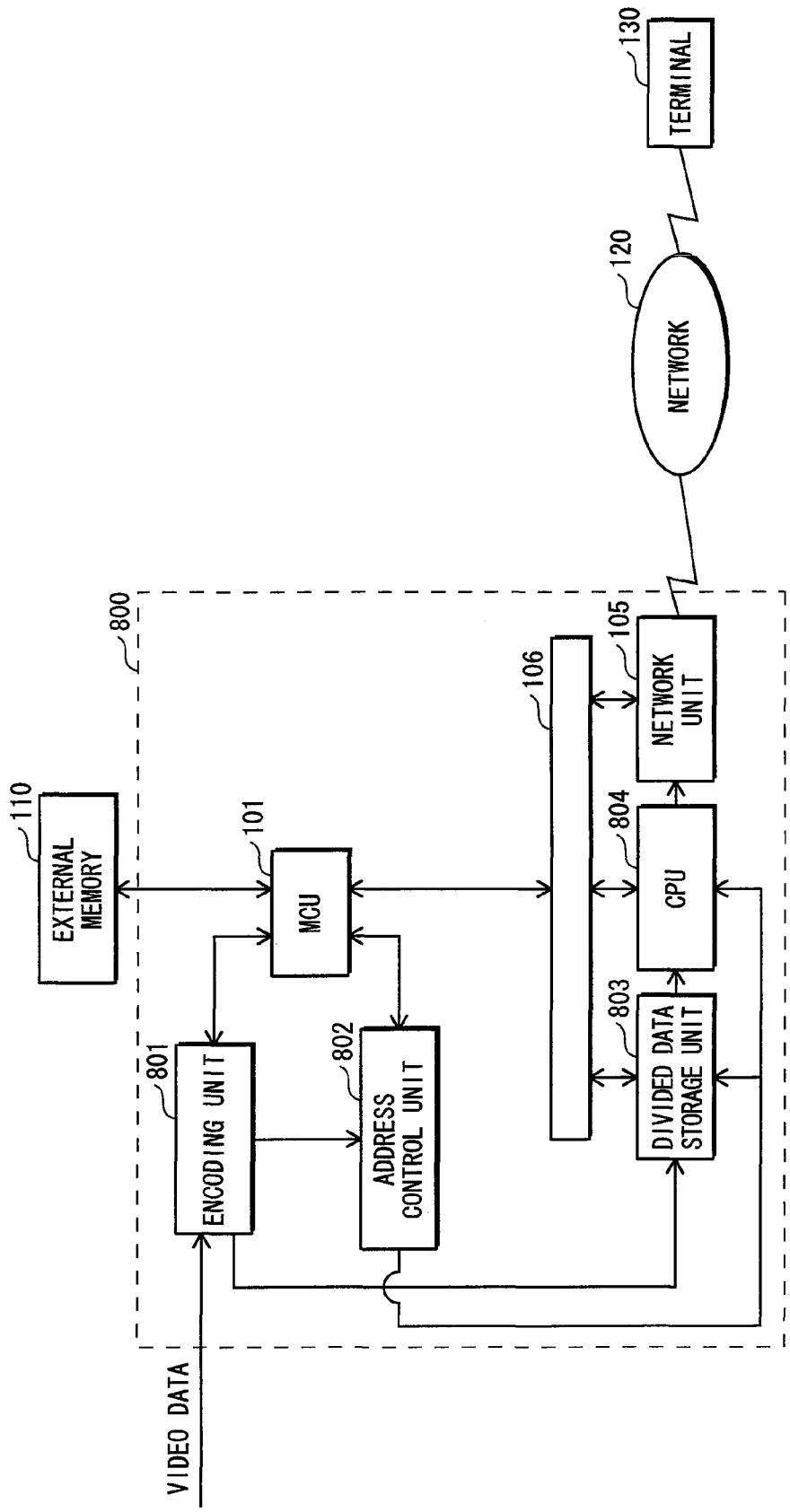
FIG. 8 shows a structure of a communication apparatus 800 pertaining to embodiment 2.

FIG. 8 shows a structure of a communication apparatus 800 pertaining to embodiment 2.

As shown in FIG. 8, similarly to the communication apparatus 100 pertaining to embodiment 1, the communication apparatus 800 is connected to the external memory 110 that is outside the communication apparatus 800, and is connected to the terminal 130 via the network 120.

Note that similarly to embodiment 1, in the description below, each packet data area is a 2304 byte area (256 bytes+2 kilobytes), the size of each address portion in the external memory 110 is one byte, and the size of data transmitted at one time by the external memory 110 is 4 bytes.

As shown in FIG. 8, the communication apparatus 800 includes the MCU 101, the network unit 105, the internal bus 106, an encoding unit 801, an address control unit 802, a divided data storage unit 803, and a CPU 804.

Since the MCU 101, the network unit 105, and the internal bus 106 are the same as in the communication apparatus 100 of embodiment 1, description thereof is omitted.

Although the encoding unit 801 is basically the same as the encoding unit 102 in embodiment 1, the encoding unit 801 differs from the encoding unit 102 in that, for each piece of encoded data that has been compression encoded, when starting to store the piece of encoded data in the external memory 110, the encoding unit 801 transmits an instruction to start processing notification to the address control unit 802.

The address control unit 802 includes an internal CPU, and is a circuit that, by causing the CPU to execute the control program stored in an internal memory (not depicted) of the communication apparatus 800, ensures areas that can be used as packet data areas out of free areas in the external memory 110, and specifies an address value of each ensured packet data area to the divided data storage unit 803 and the CPU 804.

Here, the address value of each packet data area is a starting address value of the packet data area.

Although the divided data storage unit 803 is basically the same circuit as the divided data storage unit 103 in embodiment 1, the divided data storage circuit 803 differs from the divided data storage unit 103 in storing a piece of block data and the checksum thereof in the first area 311 of the packet data area indicated by the address value designated by the address control unit 802.

The following specifically describes the divided data storage unit 803.

Although the structure of the divided data storage unit 803 is basically the same as the structure of the divided data storage unit 103 shown in FIG. 2, the divided data storage unit 803 differs with respect to a DTC register and a control unit, which are therefore described below.

The register of the divided data control unit 803, in addition to holding each of the address values held by the register 204 of the DTC 206 of the divided data storage unit 103, holds a starting address value of each of the packet data areas designated by the address control unit 802.

The control unit of the divided data storage unit 803 is basically the same circuit as the control unit 207 of the divided data storage unit 103. The control unit differs from the control unit 207 of the divided data storage unit 103 in setting an address value as the starting address value of the first area 311 in the counter 203 of the divided data storage unit 803, the address value being the sum of adding an address value indicating a packet data area set in the register of the divided data storage unit 803 to the address value of the size of the second area 312 set by the CPU 804 in the register of the divided data storage unit 803 (256).

The CPU 804 basically has the same functions as the CPU 104 in embodiment 1. However, the CPU 804 differs from the CPU 104 in that by executing a program, the checksum is read from the first area 311 of the packet data area indicated by the address value designated by the address control unit 802, and the generated header information is stored in the second area 312 of the packet data area including the read checksum.

Reading the checksum stored in the each of the first areas 311 by the control program and storing the pieces of header information in each of the second areas 312 can be realized by basically the same method as the CPU 104 in embodiment 1, but in the present embodiment, there is a need to access each of the packet data areas by setting address values sequentially designated by the address control unit 802 as the pointer variable A that points to the address of the variable S of the structure.

Data

The following describes the arrangement of the packet data areas.

Figure 9:
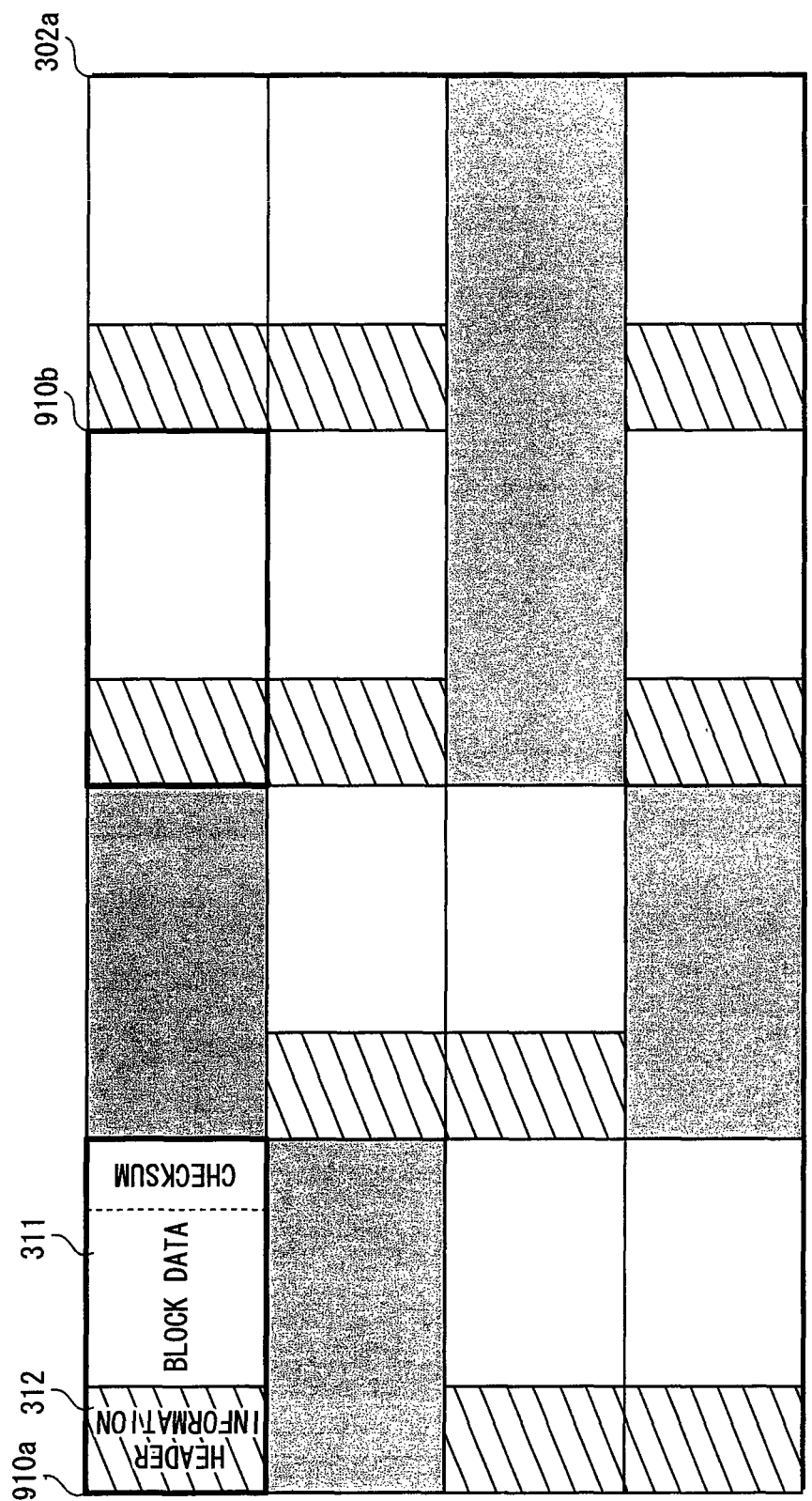

FIG. 9 shows the network data area 302a in the external memory 110 of embodiment 2. Note that although only the network data area 302a is described here, the network data area 302b is the same.

As shown in FIG. 9, the packet data areas 910a, 910b, etc. are arranged non-contiguously in the network data area 302a. The areas that are shaded in gray in FIG. 9 indicate that other data is stored in such areas, etc.

Since the packet data areas 910a, 910b, etc. are similar to the packet data areas 310a, 310b, etc., description thereof is omitted.

Operation

The following describes operation of the communication apparatus 800 that processes the above data and has the structure described above.

Address Control Unit

First, the operation of the address control unit 802 is described.

Figure 10:
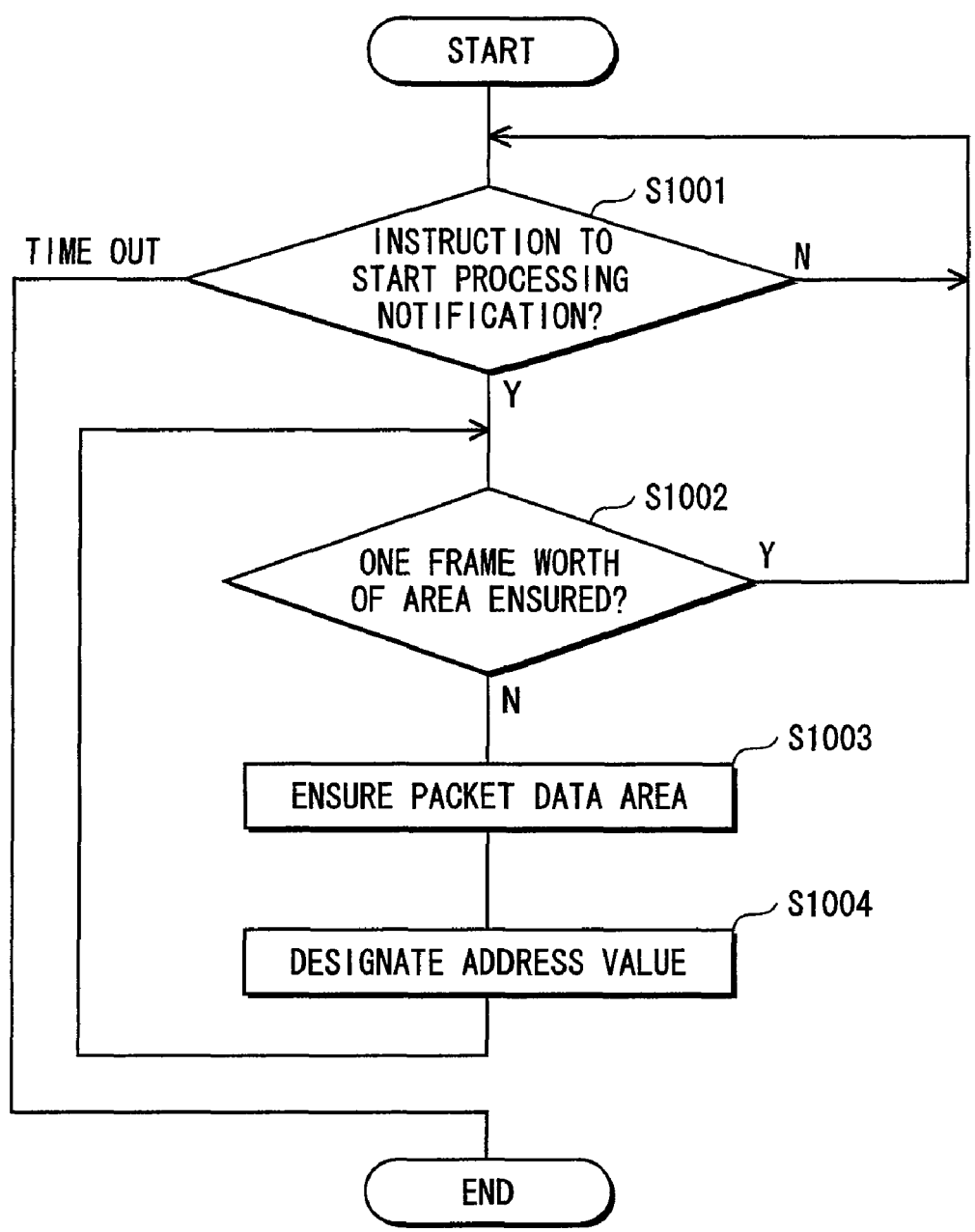
FIG. 10 is a flowchart showing processing of an address control unit 802.

FIG. 10 is a flowchart showing the operation of the address control unit 802.

By executing the control program, the CPU of the address control unit 802 checks whether an instruction to start processing notification has been received from the encoding unit 801 (step S1001).

If the instruction to start processing notification has not been received (step S1001:N), processing returns to step S1001.

If the instruction to start processing notification has not been received in a predetermined time period (step S1001: time out), processing ends.

If the instruction to start processing notification has been received (step S1001:Y), by executing the control program, the CPU of the address control unit 802 checks whether one frame worth of packet data area has been ensured (step S1002).

If one frame worth of packet data area has not been ensured (step S1002:N), by executing the control program, the CPU of the address control unit 802 ensures an area to use as the packet data area from among the available areas in the external memory 110 (step S1003).

By executing the control program, the CPU of the address control unit 802 designates an address value indicating the ensured packet data area to the divided data storage unit 803 and the CPU 804 (step S1004), and processing returns to step S1002.

If the one frame worth of packet data area has been ensured (step S1002:Y), processing returns to step S1001.

Divided Data Storage Unit

The following describes the operation of the divided data storage unit 803.

Figure 11:
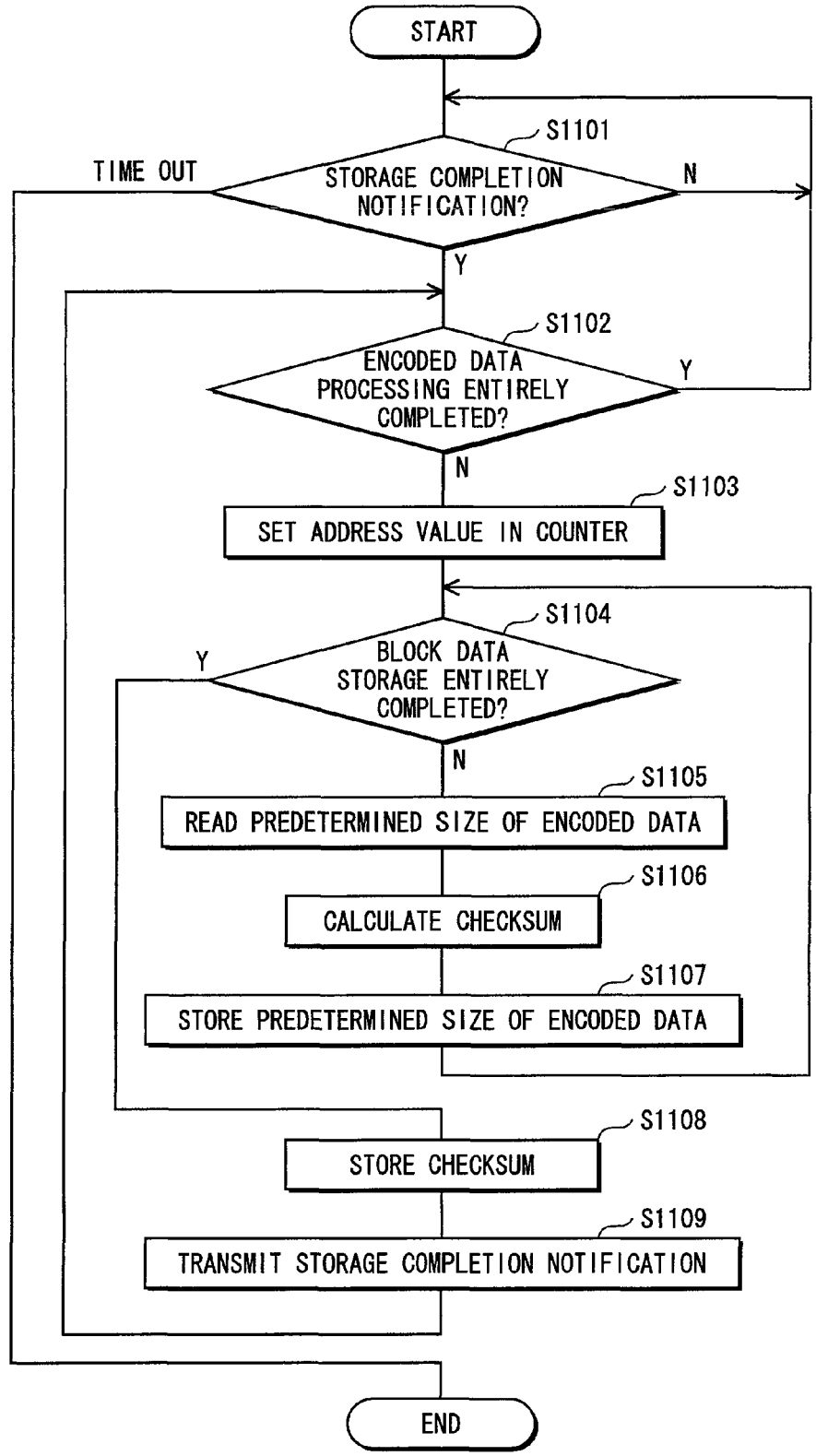
FIG. 11 is a flowchart showing processing of a divided data storage unit 803.

FIG. 11 is a flowchart showing the operation of the divided data storage unit 803.

Since processing in steps S1101 to S1102 and steps S1104 to S1109 is the same as the processing performed by the divided data storage unit 103 pertaining to embodiment 1 in steps S501 to S502 and S503 to S508 shown in FIG. 5, respectively, description thereof is omitted, and the following describes the processing of step S1103.

The control unit of the divided data storage unit 803 reads one address value out of the address values designated by the address control unit 802 set in the register of the divided data storage unit 803, and sets an address value as the write address value in the counter 203 of the divided data storage unit 803, the set address value being a sum of the read address value and an address value corresponding to the size of the second area 312 set in the register of the divided data storage unit 803 (step S1103).

CPU

The following describes the operation of the CPU 804.

Although the operation of the CPU 804 is basically the same as the operation of the CPU 104 shown in the flowchart of FIG. 6, in step S602, the checksum is read from the first area 311 of the packet area indicated by the address value designated by the address control unit 802, and also, in step S604, header information is stored in the second area 312 of the packet area indicated by the address value designated by the address control unit 802.

Since the other aspects of operation are the same as those of the CPU 104, description thereof is omitted.

Timing Chart

Next, the timings of the operation of the address control unit 802 are described.

Figure 12:
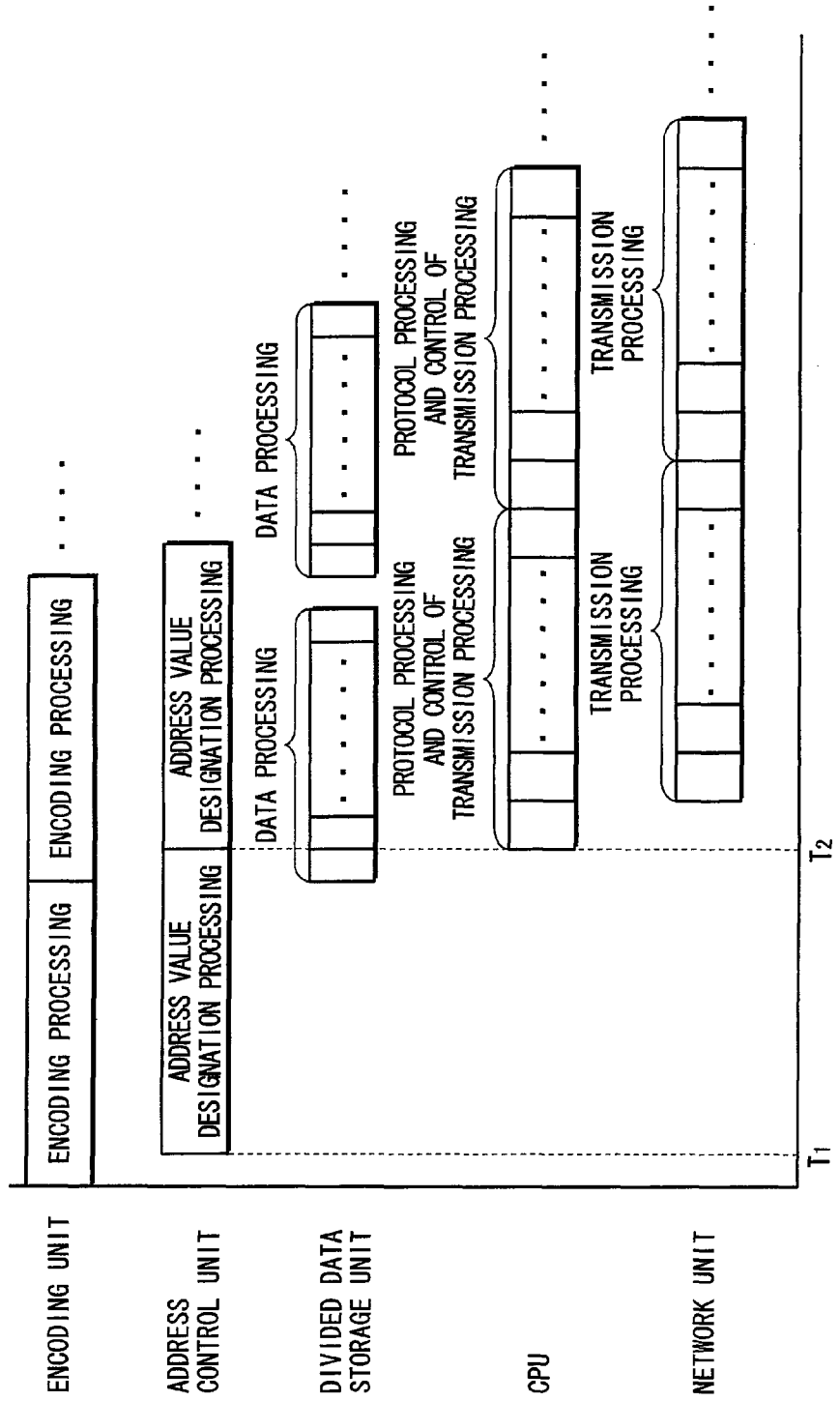
FIG. 12 is a timing chart showing processing of various units in the communication apparatus 800.

FIG. 12 is a timing chart showing the operation of various units in a communication apparatus 800.

Note that since the operation timings of the encoding unit 801, the divided data storage unit 803, the CPU 804, and the network unit 105 are the same as the operation timings shown in the timing chart of FIG. 7, description thereof is omitted.

T1 is a timing at which the CPU of the address control unit 802 receives the instruction to start processing notification from the encoding unit 801, and starts processing.

From T1 to T2, the CPU of the address control unit 802 ensures one frame worth of packet data areas, and designates address values indicating the packet data areas, in accordance with the flowchart of FIG. 10.

Variation 1

Overview

In the communication apparatus 800 of embodiment 2, since the address control unit 802 designates address values indicating each of the packet data areas to the divided data storage unit 803 and the CPU 804, processing can be performed even when the packet data areas are non-contiguously arranged.

Similarly to the communication apparatus 800, the communication apparatus of variation 1 can perform processing even when packet data areas are non-contiguously arranged, since the communication apparatus stores, in each packet data area, an address value of a packet data area to be referenced next, and the divided data storage unit and the CPU pertaining to variation 1 reference the address value.

Structure

The following describes a structure of a communication apparatus 1300 pertaining to variation 1.

Figure 13:
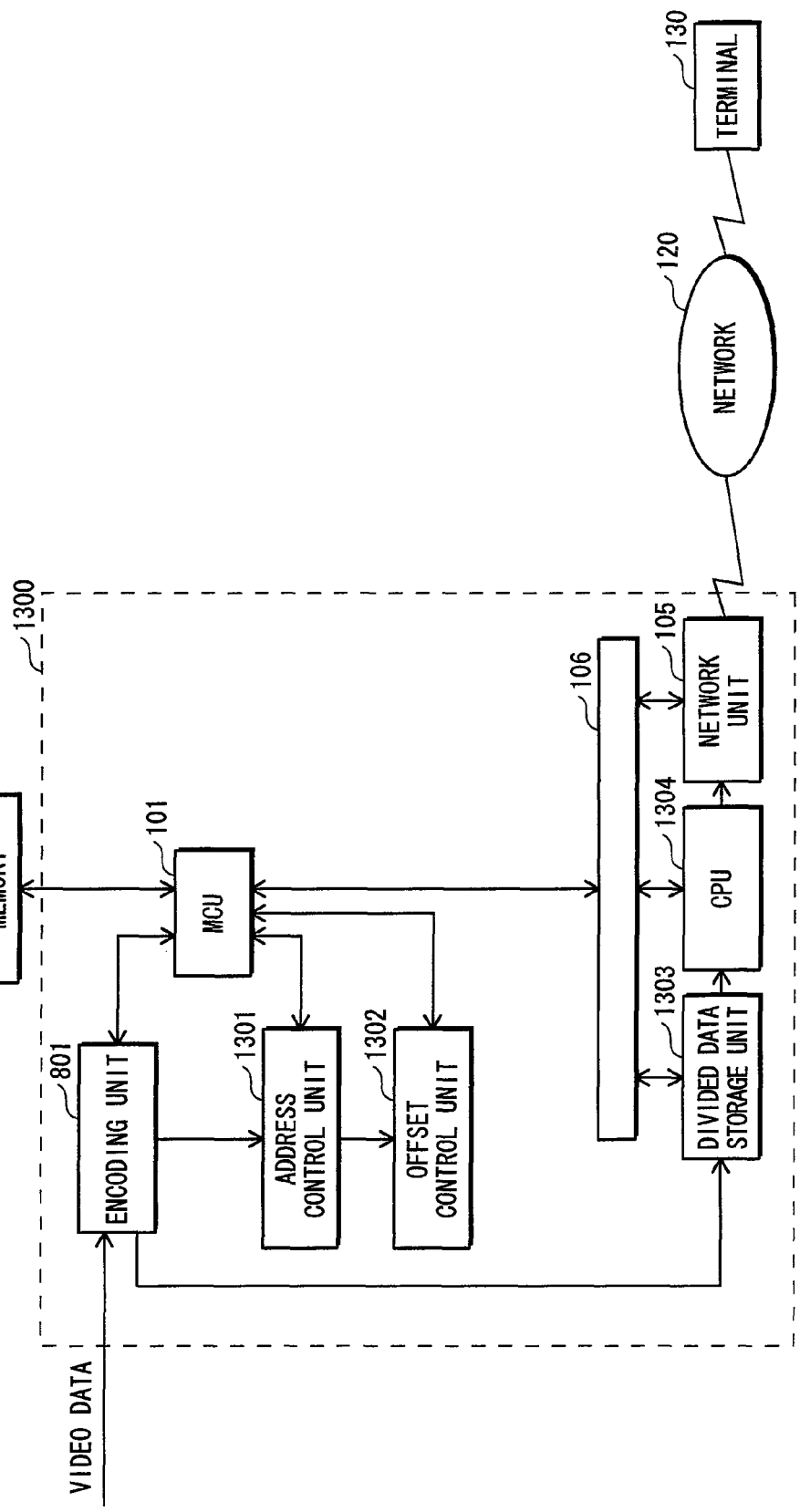
FIG. 13 shows a structure of a communication apparatus 1300 pertaining to variation 1.

FIG. 13 shows the structure of the communication apparatus 1300 pertaining to variation 1.

As shown in FIG. 13, similarly to the communication apparatus 100 pertaining to embodiment 1, the communication apparatus 1300 is connected to the external memory 110 that is outside the communication apparatus, and is also connected to the terminal 130 via the network 120.

As shown in FIG. 13, the communication apparatus 1300 includes the MCU 101, the network unit 105, the internal bus 106, the encoding unit 801, an address control unit 1301, an offset control unit 1302, a divided data storage unit 1303, and a CPU 1304.

Since the MCU 101, the network unit 105, and the internal bus 106 are the same as in the communication apparatus 100 pertaining to embodiment 1, and the encoding unit 801 is the same as in the communication apparatus 800 of embodiment 2, description thereof is omitted.

Although the address control unit 1301 is basically the same circuit as the address control unit 802 in embodiment 2, the address control unit 1301 differs from the address control unit 802 in designating the address values indicating the ensured packet data areas to the offset control unit 1302.

Note that the address control unit 1301 also designates the address value of the packet data area to be accessed first to both the divided data storage unit 1303 and the CPU 1304.

The offset control unit 1302 includes an internal CPU, and is a circuit that, by causing the CPU to execute the control program stored in an internal memory (not depicted) of the communication apparatus 1300, for each address value designated by the address control unit 1301, stores the subsequently designated address value in a second area 1412, described later, of the packet data area indicated by the address value.

Since storage of the address value in the second storage area 1412 by the control program is, similarly to in the CPU 804, realized by a method that uses a structure composed of variables, description thereof is omitted.

Although the divided data storage unit 1303 is basically the same circuit as the divided data storage unit 103 in embodiment 1, the divided data storage unit 1303 differs from the divided data storage unit 103 in storing block data and the checksum thereof in the first area 311 of a packet data area indicated by an address value stored in the second area 1412 of a packet data area.

The following specifically describes the divided data storage unit 1303.

Although the structure of the divided data storage unit 1303 is basically the same as the structure of the divided data storage unit 103 shown in FIG. 2, the divided data storage unit 1303 differs with respect to the DTC register and the control unit, which are therefore described below.

In addition to holding address values similarly to the register 204 of the DTC 206 of the divided data storage unit 103, the register of the divided data storage unit 1303 also holds a starting address value that indicates a packet data area to be referenced first, and is designated by the address control unit 802, or an address value that indicates a packet data area to be accessed next and was read from the second area 1412, described later, by the control unit of the divided data storage unit 1303.

Although the control unit of the divided data storage unit 1303 is basically the same circuit as the control unit 207 of the divided data storage unit 103, the control unit of the divided data storage unit 1303 differs from the control unit 207 in the following respects. When the transfer unit 205 of the DTC in the divided data storage unit 1303 completes storage of one piece of block data and the checksum of the piece of block data, the control unit of the divided data storage unit 1303 reads an address value of the packet data area to be accessed next from the second area 1412 to the register of the divided data storage unit 1303. Also, the value set as the write address value in the counter 203 is obtained by adding the above address value to an address value (256) that is the size of the second area 1412 set in the register of the divided data storage unit 1303 by the CPU 1304.

Although the CPU 1304 basically has the same functions as the CPU 104 in embodiment 1, the CPU 1304 differs from the CPU 104 in acquiring a checksum from the first area 311 of a packet data area indicated by an address value stored in the second area 1412, described later, of a packet data area.

Although reading the checksum stored in the first area 311 by the control program and storing the header information to the second area 1412 can be realized by basically the same method as the CPU 104 in embodiment 1, since the address value of the packet data area to be accessed next is stored in the second area 1412 in the present embodiment, there is a need to access the packet data areas by adding the variable N indicating the address value of a next packet data area to the structure variable S, and setting the variable N as the pointer variable A indicating the address of the structure variable S.

Data

The following describes the arrangement of the packet data areas.

Figure 14:
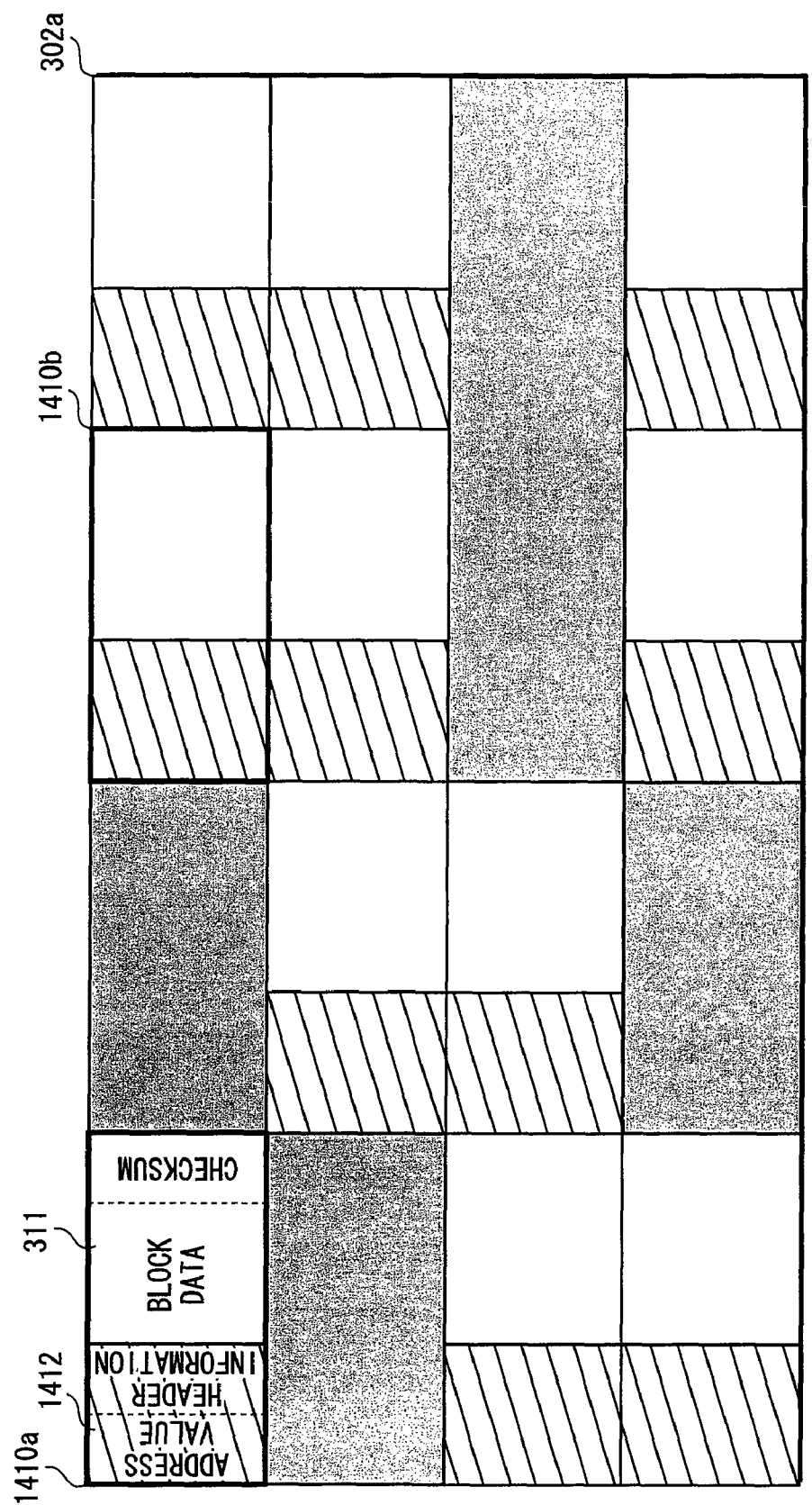

FIG. 14 shows the network data area 302a of variation 1 in the external memory 110.

In FIG. 14, the packet data areas 1410a, 1410b, etc. are arranged non-contiguously in the network data area 302a. The areas that are shaded in gray in FIG. 14 indicate that other data is stored in such areas, etc.

Since the packet data areas 1410a, 1410b, etc. are similar areas, only the packet data area 1410a is described below.

The packet data area 1410a is an area that is logically divided into a first area 311 and a second area 1412. Since the first area 311 is the same as in embodiment 1, description thereof is omitted.

The second area 1412 is an area that, in addition to storing header information similarly to the second area 312 in embodiment 1, stores an address value indicating the packet data area to be referenced next after the packet data area 1410a that includes the second area 1412, in other words, an address value indicating the packet data area 1410b.

Since the address value indicating the packet data area to be referenced next is stored in the second area 1412, the packet data areas have a so-called linear list structure.

Although the second area 1412 can be any size provided that the address value of the packet data area to be referenced next (4 bytes in the following description) and the header information (54 bytes) can be stored, the size is 256 bytes in the following description, the same as in embodiment 1.

Also, in the present embodiment, the header information is stored such that the address value of the fifth byte from the starting address value of the second area 1412 is the starting address value.

Operation

The following describes the operation of the communication apparatus 1300 that processes the above data and has the structure described above.

Address Control Unit

First, the operation of the address control unit 1301 is described.

Although the operation of the address control unit 1301 is basically the same as the operation of the address control unit 802 shown in the flowchart of FIG. 10, the address control unit 1301 differs in that the address value indicating the packet data area ensured in step S1004 of FIG. 10 is designated in the offset control unit 1302.

Since other aspects of operation are the same as the address control unit 802, description thereof is omitted.

Offset Control Unit

The following describes the operation of the offset control unit 1302.

Figure 15:
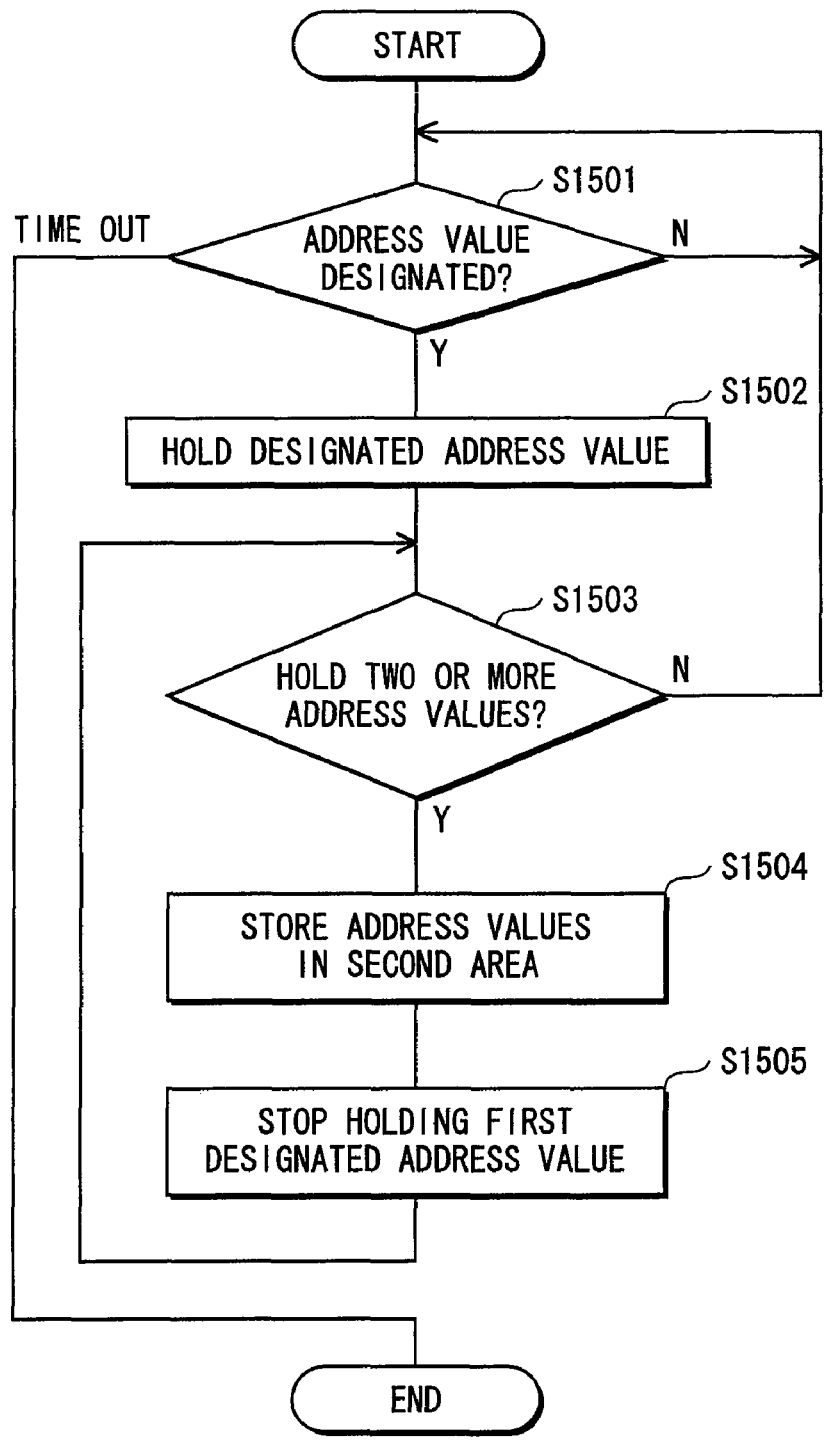
FIG. 15 is a flowchart showing processing of an offset control unit 1302.

FIG. 15 is a flowchart showing the operation of the offset control unit 1302.

By executing the control program, the CPU of the offset control unit 1302 checks whether an address value has been designated by the address control unit 1301 (step S1501).

If the address value has not been designated (step S1501: N), processing returns to step S1501.

If the address value has not been designated in a predetermined time period (step S1501: time out), processing ends.

If the address value has been designated (step S1501:Y), by executing the control program, the CPU of the offset control unit 1302 holds the designated address value. Specifically, the designated address value is added to a queue realized with use of an array variable, for example. An area in the internal memory of the communication apparatus 1300 is allotted to the array variable.

By executing the control program, the CPU of the offset control unit 1302 checks whether there are two or more address values to be held (step S1503).

If there are not two or more address values to be held (step S1503:N), processing returns to step S1501.

If there are two or more address values to be held (step S1503:Y), out of two address values starting from the address value that was designated first, that is to say, out of the first two address values in the queue, the address value that was designated second is stored in the second area 1412 of the packet data area indicated by the address value that was designated first (step S1504).

Of the two or more held address values, the CPU stops holding the address value designated first, that is to say, deletes the address value at the start of the queue (step S1505), and processing returns to step S1503.

Divided Data Storage Unit

The following describes the operation of the divided data storage unit 1303.

Figure 16:
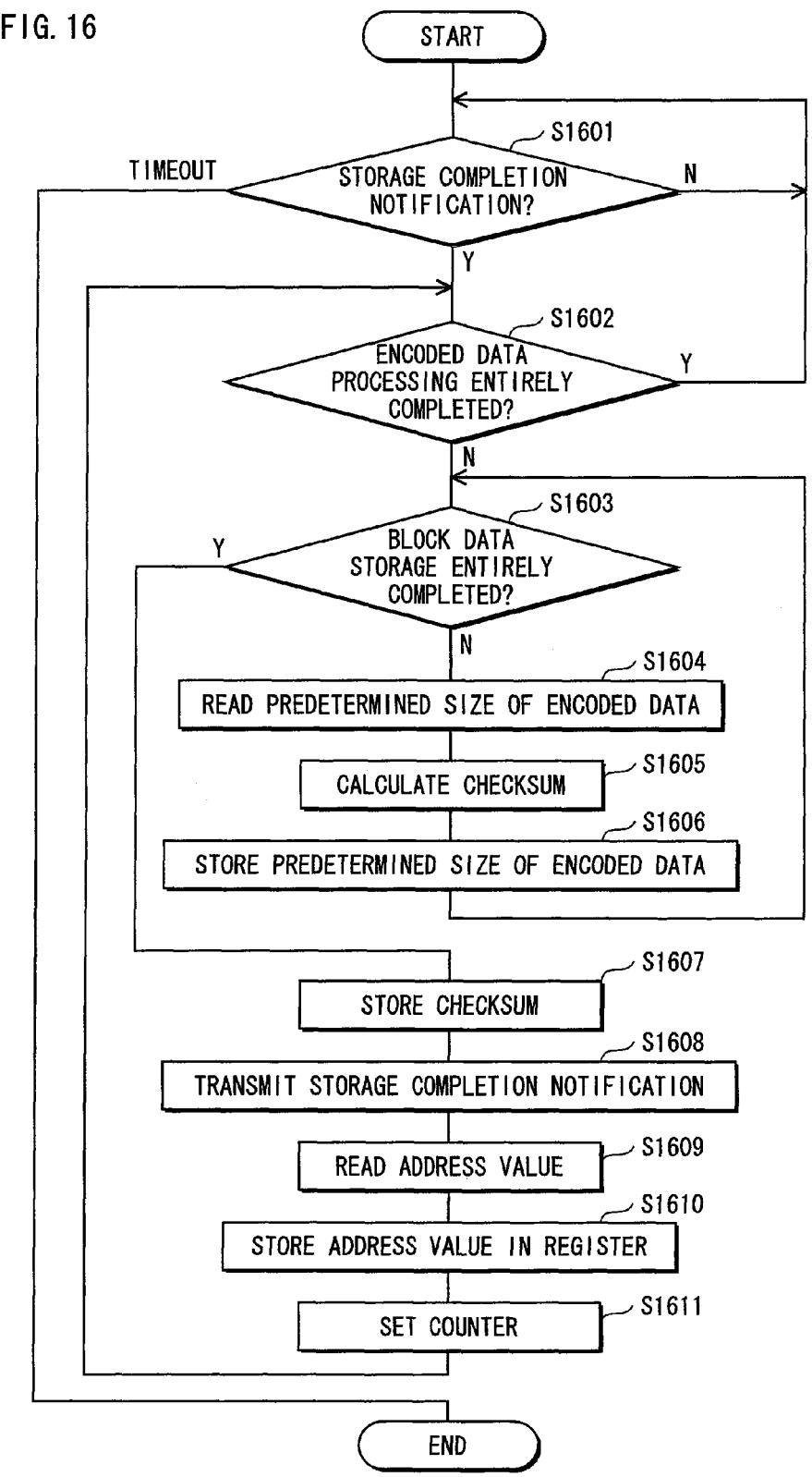
FIG. 16 is a flowchart showing processing of a divided data storage unit 1303.

FIG. 16 is a flowchart showing the operation of the divided data storage unit 1303.

Note that the register of the divided data storage unit 1303 stores a starting address value of the packet data area that has been designated by the address control unit 802 to be accessed first, and for the write address value, a setting of an address value of the first area 311 to be accessed first is set in the counter 203 of the divided data storage unit 1303.

Since the processing of steps S1601 to S1608 is the same as the processing of steps S501 to S508 in FIG. 5 performed by the divided data storage unit 103 pertaining to embodiment 1, description thereof is omitted.

The control unit of the divided data control unit 1303 reads the address value set in the register of the divided data control unit 1303 (the starting address value of the packet data area), and reads the address value of the packet data area that is to be accessed next and is stored in the second data area 1412 of the packet data area indicated by the read address value (step S1609).

The control unit of the divided data storage unit 1303 sets the address value of the read packet data area to be accessed next in the register of the divided data storage unit 1303 (step S1610).

The control unit of the divided data storage unit 1303 sets, as the write address value in the counter 203, an address value obtained by adding the size of the second area 1412 set in the register of the divided data storage unit 1303 to the starting address value of the packet data area stored in the register to be referenced next (step S1611), and processing returns to step S1602.

CPU

The following describes the operation of the CPU 1304.

Figure 17:
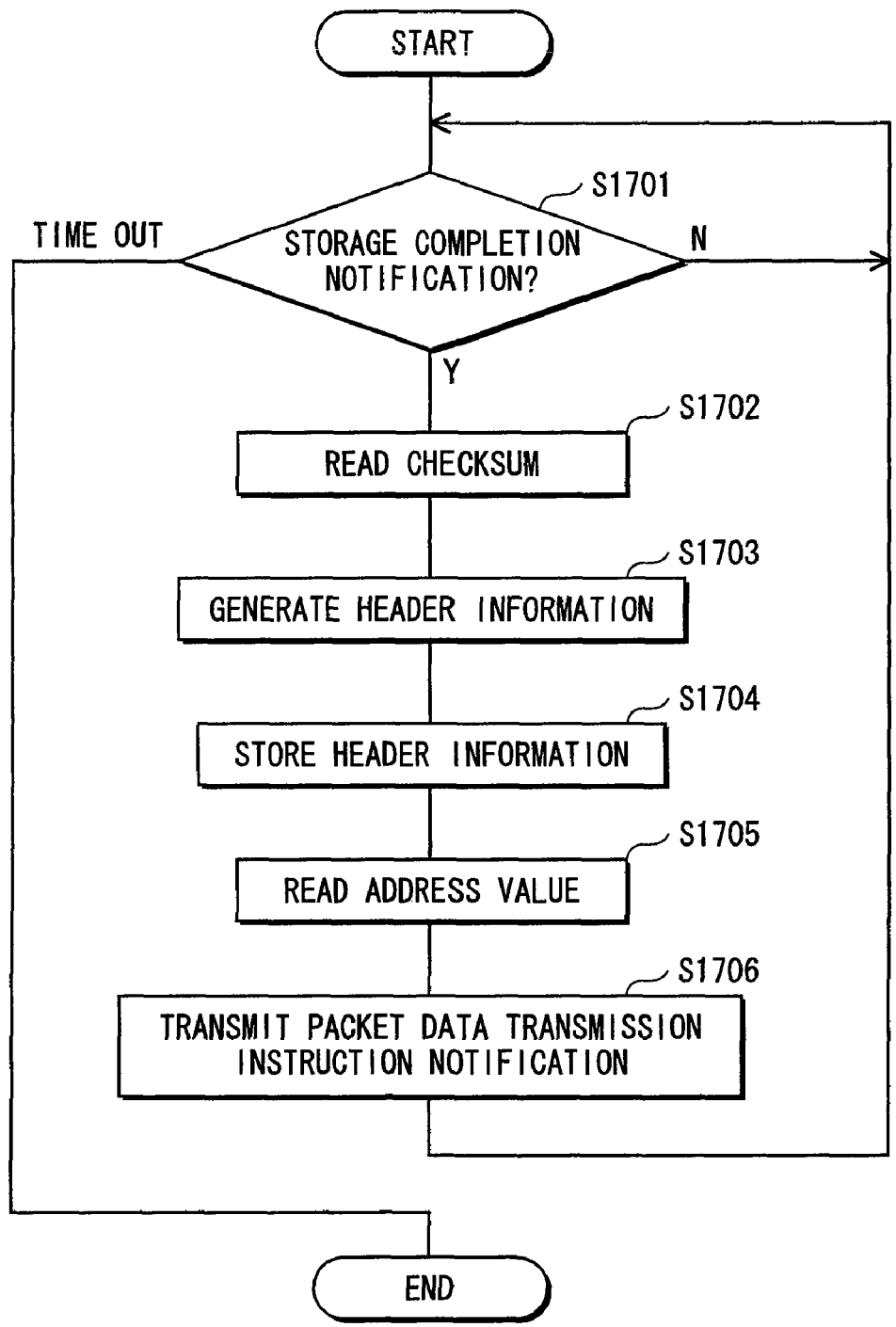
FIG. 17 is a flowchart showing processing of a CPU 1304.

FIG. 17 is a flowchart showing the operation of the CPU 1304.

Since the processing of step S1701 is the same as processing of step S601 shown in FIG. 6 performed by the CPU 104 pertaining to embodiment 1, description thereof is omitted.

By executing the control program, the CPU 1304 reads the checksum stored in the first area 311 of the packet data area indicated by the address value designated by the address control unit 1301 (step S1702).

Since the processing from steps S1703 to S1704 is the same as the processing from steps S603 to S604 shown in FIG. 6 in embodiment 1, description thereof is omitted.

By executing the control program, the CPU 1304 reads an address value indicating the packet data area to be accessed next that is stored in the second data area 1412 of the packet data area in which the checksum read in step S1702 is stored (step S1705).

Since the processing of step S1706 is the same as the processing of step S605 performed by the CPU 104 shown in FIG. 6 pertaining to embodiment 1, description thereof is omitted.

In this way, the CPU 1304 can perform processing for storage of one piece of header information and an instruction for transmitting packet data. Hereinafter, in step S1702, by reading the checksum stored in the first area 311 of the packet data area indicated by the address value read in step S1705, the CPU 1304 can store the header information in the second area 1412 in sequential packet data areas.

Timing Chart

Next, the timings of the operations of the offset control unit 1302 are described.

Figure 18:
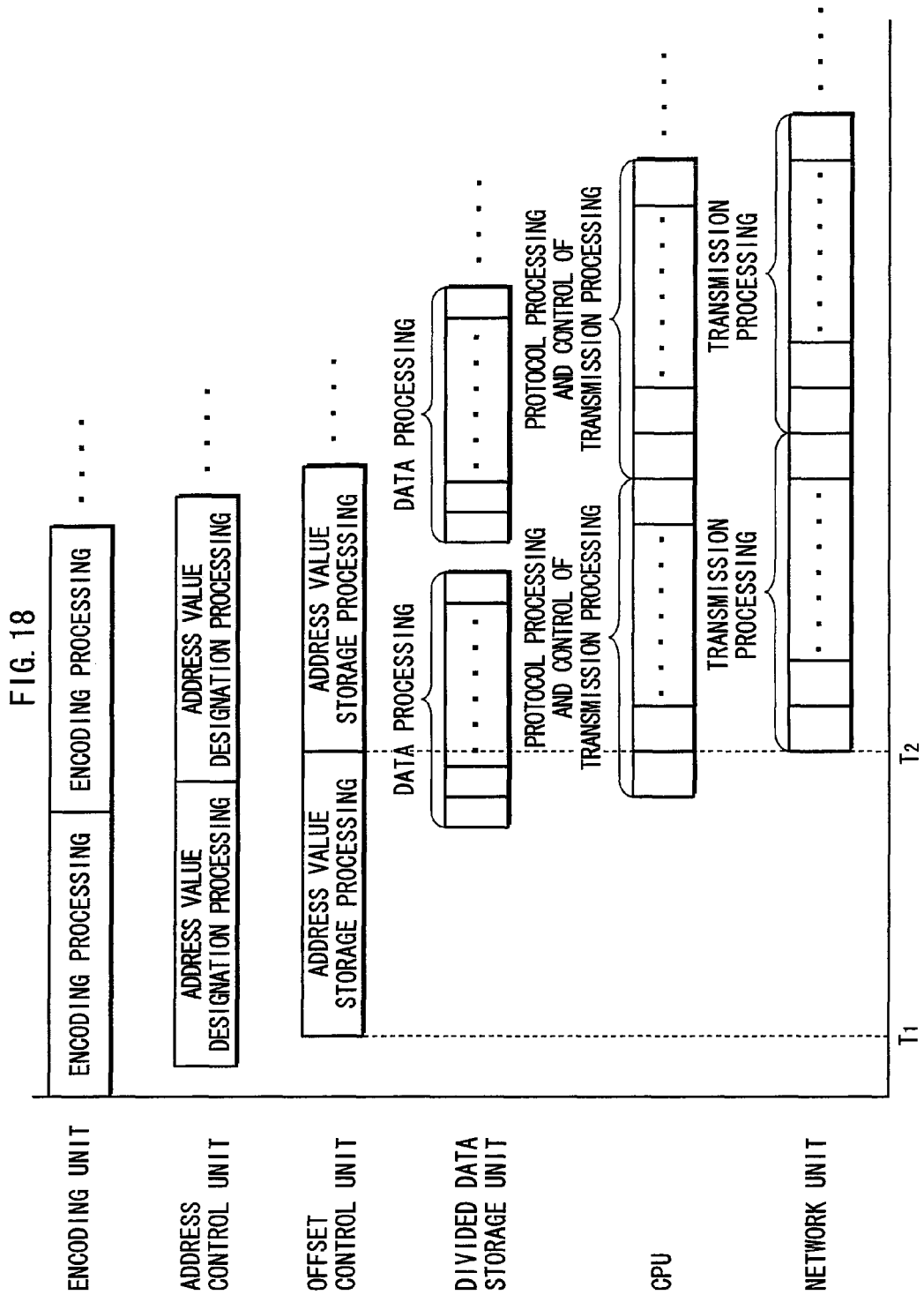
FIG. 18 is a timing chart showing processing of various units in a communication apparatus 1300.

FIG. 18 is a timing chart showing operations of various units in the communication apparatus 1300.

Note that since the operation timings of the encoding unit 801, the address control unit 1301, the divided data storage unit 1303, the CPU 1304, and the network unit 105 are the same as the operation timings indicated in the timing chart of FIG. 12, description thereof is omitted.

T1 is a timing at which the number of address values received from the address control unit 1301 and held reaches two or more, and the CPU of the offset control unit 1302 starts processing.

From T1 to T2, the CPU of the offset control unit 1302 performs processing according to the flowchart of FIG. 15, and each time the number of held address values reaches two or more, performs processing to store the address value designated second in the second area 1412 of the packet data area indicated by the address value designated first.

Variation 2

Overview

In the communication apparatus 800 pertaining to embodiment 2, since the address control unit 802 designates physical address values indicating the packet data areas in the divided data storage unit 803 and the CPU 804, processing can be performed even when the packet data areas are arranged non-contiguously.

In the communication apparatus of variation 2, logical address values are managed in correlation with physical address values of packet data areas, thereby enabling the communication apparatus, divided data storage unit, and CPU pertaining to variation 2 to access the packet areas by designating the logical address values without being conscious of the actual arrangement of the packet data areas.

Structure

The following describes the structure of a communication apparatus 1900 pertaining to variation 2.

Figure 19:
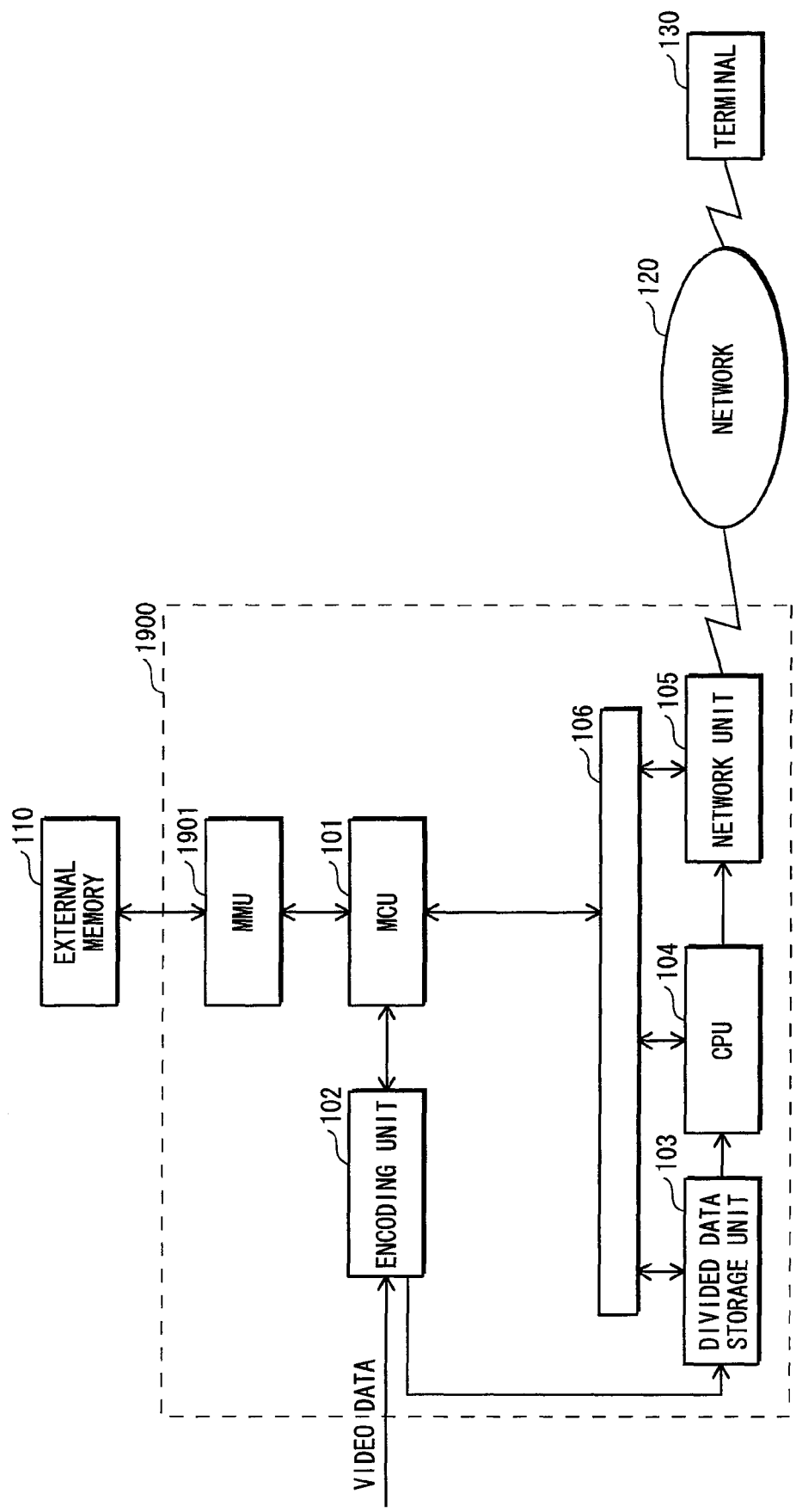
FIG. 19 shows a structure of a communication apparatus 1900 pertaining to variation 2.

FIG. 19 shows the structure of the communication apparatus 1900 pertaining to variation 2.

As shown in FIG. 19, the communication apparatus 1900 includes the MCU 101, the encoding unit 102, the divided data storage unit 103, the CPU 104, the network unit 105, the internal bus 106, and an MMU (Memory Management Unit) 1901.

Since constituent elements other than the MMU 1901 are the same as in the communication apparatus 100 pertaining to embodiment 1, description thereof is omitted.

The MMU 1901 is the same circuit as a general MMU. The MMU 1901 stores, in an internal cache memory, an address conversion table indicating actual physical address values in the external memory 110 and logical address values in correspondence with each other. If an access to the external memory 110 from the divided data storage unit 103, the CPU 104, or the network unit 105 designates a logical address value, the MMU 101 converts the designated logical address value to the corresponding physical address value.

Note that the address conversion table is created by a method similar to a method used by a general OS (Operating System) to create a page table, and the CPU 104 creates the address conversion table by executing the control program.

Data

The following describes the address conversion table stored by the MMU 1901.

As shown in FIG. 9, in the following description, the packet data areas 910*a*, 910*b*, etc. are arranged in physically non-contiguous locations in the network data area 302*a*.

Note that similarly to embodiment 1, the size of each address in the external memory 110 is 1 byte, the first area 311 is a 2-kilobyte area, and the second area 312 is a 256-byte area.

FIG. 20 shows a data structure and exemplary content of the address conversion table.

As shown in FIG. 20, an address conversion table 2000 has a structure in which, for each area defined by an address in the external memory 110, a logical address value 2001 is correlated with a physical address value 2002.

Here, the logical address values 2001 are address values (numerical values) used when the divided data storage unit 103, the CPU 104, and the network unit 105 access the external memory 110, and are assigned so as to be numbered consecutively from 1.

The physical address value 2002 is an address value (numerical value) indicating an actual physical location of an area in the external memory 110.

In FIG. 20, the logical address values 2001 corresponding to the second area 312 of the packet data area 910*a* in FIG. 9 are numbered 1 to 256, and the physical address values 2002 are numbered 10001 to 10256.

Also, the logical address values 2001 corresponding to the first area 311 of the packet data area 910*a* are numbered 257 to 2304, and the physical address values 2002 are numbered 10257 to 12304.

Also, the logical address values 2001 corresponding to the second area 312 of the packet data area 910*b* are numbered 2305 to 2560, and the physical address values 2002 are numbered from 16001 to 16256.

As described above, since the packet data area 910*a* and the packet data area 910*b* are arranged in physically non-contiguous locations, the physical address value 2002 corresponding to the last area of the first area 311 of the packet data area 910*a* is "12304", the physical address value 2002 corresponding to the first area of the second area 312 of the packet data area 910*b* is "16001", and these two address values are non-contiguous.

Meanwhile, the logical address values 2001 for all of the areas are consecutively assigned numbers from 1 to 2560.

Accordingly, even if the divided data storage unit 103, the CPU 104, and the network unit 105 access physically non-contiguous areas, designating the logical address value 2001 enables access as if the areas were physically contiguous.

Operation

The following describes the operation of the MMU 1901.

Figure 21:
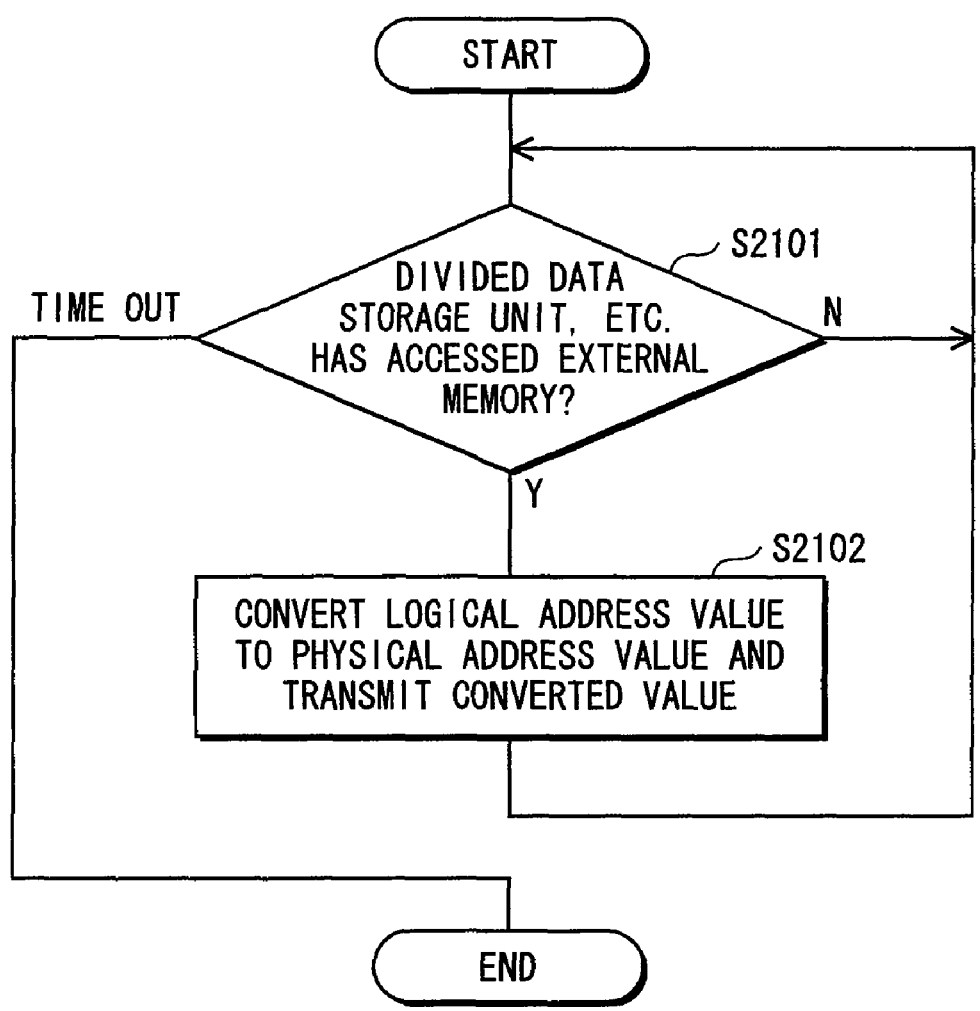
FIG. 21 is a flowchart showing processing of an MMU 1901.

FIG. 21 is a flowchart showing the operations of the MMU 1901.

The MMU 1901 checks whether an access to the external memory 110 from the divided data storage unit 103, the CPU 104, or the network unit 105 designates a logical address value (step S2101).

If the external memory 110 has not been accessed (step S2101:N), processing returns to step S2101.

If the external memory has not been accessed in a predetermined time period (step S2101: time out), processing ends.

If the external memory 110 has been accessed (step S2101: Y), the MMU 1901 converts the designated logical address value to a physical address value and transmits the physical address value (step S2102), and processing returns to step S2101.

Note that since the operation timings of various units in the communication apparatus 1900 are the same as the operation timings indicated in the timing chart of FIG. 7, description thereof is omitted.

Variation 3

Overview

In the communication apparatus 100 pertaining to embodiment 1, the divided data storage unit 103 waits until the encoding unit 102 completes storing the encoded data to the encoded data area 301a or 301b of the external memory 110 before starting processing.

The communication apparatus pertaining to variation 3 monitors the size of the encoded data that is being stored in the encoded data area 301a or 301b by the encoding unit 102, and whenever the size reaches the size of a piece of block data (1472 bytes), causes the divided data storage unit pertaining to variation 3 to process the encoded data.

In this way, the divided data storage unit pertaining to variation 3 can start processing without waiting for the encoding unit 102 to complete storage of the encoded data to the encoded data areas 301a and 301b, and reducing the unnecessary waiting time enables further high-speed video data send processing.

Structure

The following describes the structure of the communication apparatus 2200 pertaining to variation 3.

Figure 22:
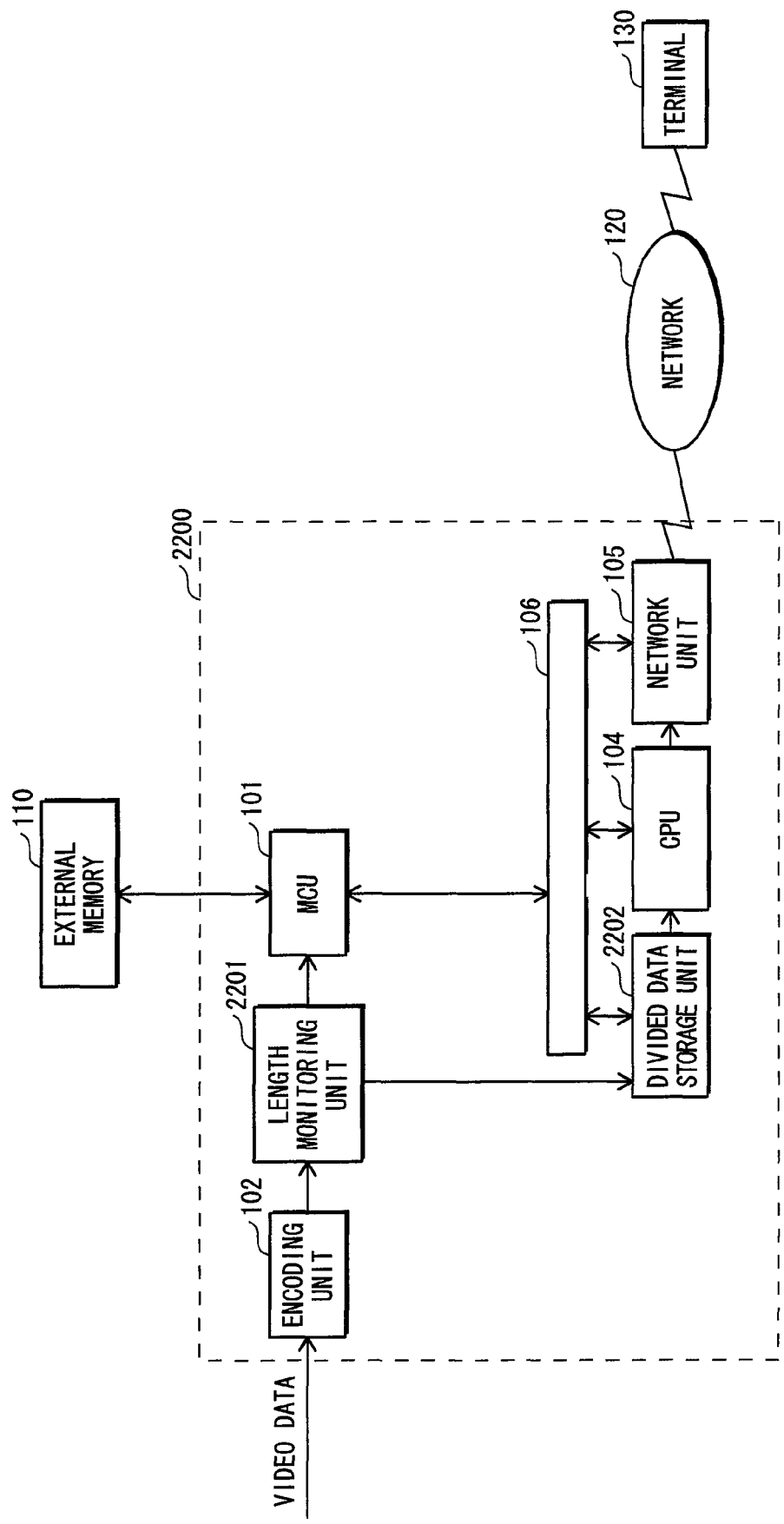
FIG. 22 shows a structure of a communication apparatus 2200 pertaining to variation 3.

FIG. 22 shows the structure of the communication apparatus 2200 pertaining to variation 3.

As shown in FIG. 22, the communication apparatus 2200 includes the MCU 101, the encoding unit 102, the CPU 104, the network unit 105, the internal bus 106, a length monitoring unit 2201, and a divided data storage unit 2202.

Since the MCU 101, the encoding unit 102, the CPU 104, the network unit 105, and the internal bus 106 are the same as in the communication apparatus 100 of embodiment 1, description thereof is omitted.

Note that in the present embodiment, even after completing storage of the encoded data in the external memory 110, the encoding unit 102 does not transmit a storage completion notification to the divided data storage unit 2202.

The length monitoring unit 2201 is a circuit that has an internal counter, counts the size of the encoded data stored by the encoding unit 102 in the encoded data area 301a or 301b of the external memory 110, and each time the counter reaches a value corresponding to the size of a piece of block data (1472 bytes), notifies the divided data storage unit 2202.

When the encoding unit 102 stores the encoded data in the encoded data area 301a or 301b of the external memory 110, the encoded data is actually transmitted in units of a predetermined size corresponding to a bus width between the encoding unit 102 and the external memory 110. In the following description, this predetermined size is 4 bytes.

Each time the encoding unit 102 transmits 4 bytes, the length monitoring unit 2201 increases the value in the counter set to zero as an initial value by four, transmits a notification to the divided data storage unit 2202 that the storage of the encoded data of the block data size has been completed when the value in the counter reaches a value corresponding to the size of a piece of the block data (1472), and resets the counter to zero.

The divided data storage unit 2202 is basically the same circuit as the divided data storage unit 103 of embodiment 1. However, the divided data storage unit 2202 differs from the divided data storage unit 103 of embodiment 1 in the following aspects. In place of a notification from the encoding unit 102 indicating that storage of the encoded data has been completed, a notification is received from the length monitoring unit 2201 indicating that storage of the block data size of encoded data has been completed, and upon receiving the notification, the divided data storage unit 2202 starts reading the block data size of the encoded data stored in the encoded data area 301a or 301b of the external memory 110.

Note that since the structure of the divided data storage unit 2202 is the same as the structure of the divided data storage unit 103 shown in FIG. 2, description thereof is omitted.

Data

Since the data used by the communication apparatus 2200 is the same as the communication apparatus 100 pertaining to embodiment 1, description thereof is omitted.

Operation

The following describes the operation of the communication apparatus 2200 that processes the above data and has the structure described above.

Length Monitoring Unit

First, the operation of the length monitoring unit 2201 is described.

Figure 23:
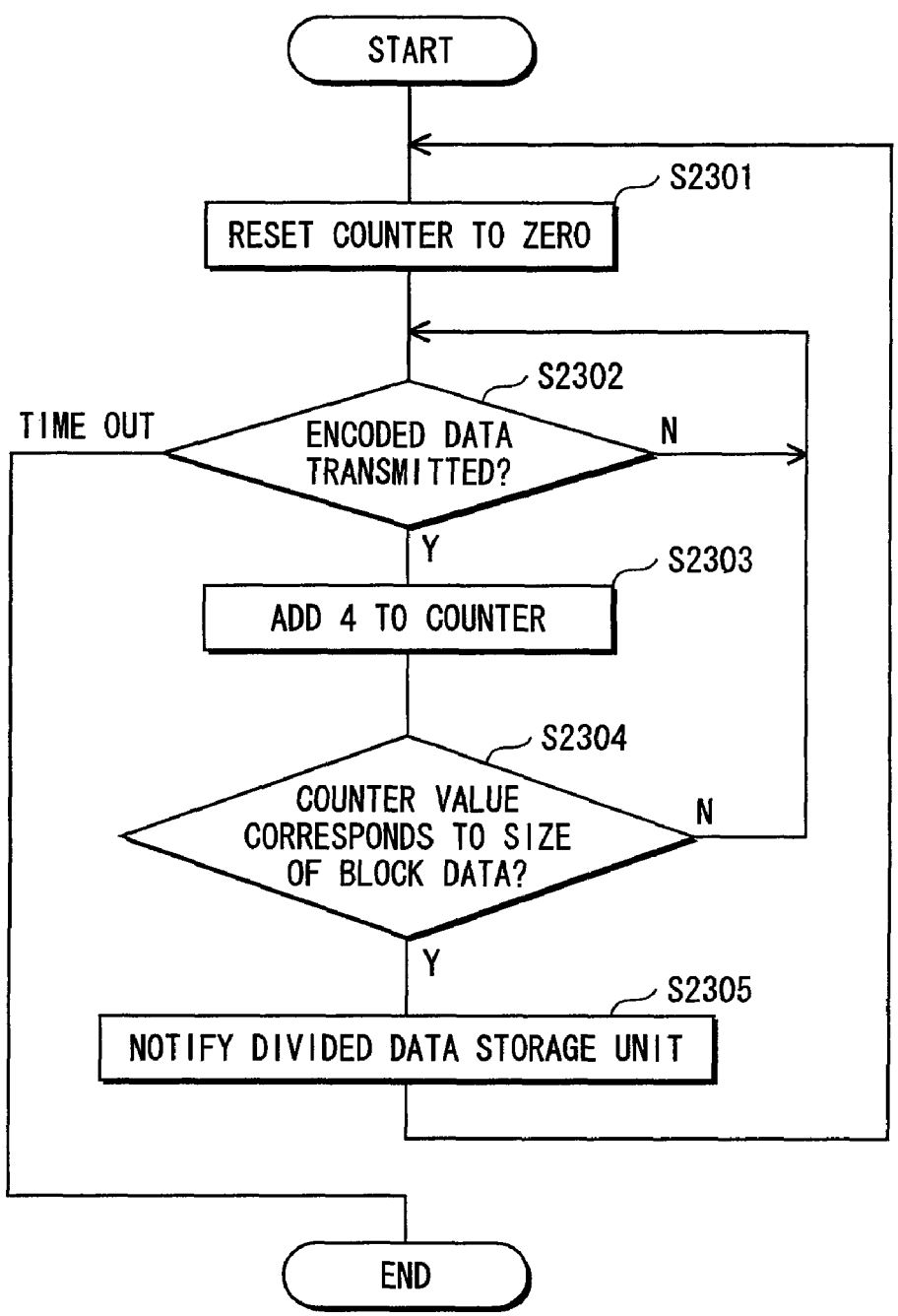
FIG. 23 is a flowchart showing processing of a length monitoring unit 2201.

FIG. 23 is a flowchart showing the operation of the length monitoring unit 2201.

The length monitoring unit 2201 resets the internal counter to zero (step S2301).

The length monitoring unit 2201 checks whether the predetermined size (4 bytes) of the encoded data has been transmitted from the encoding unit 102 (step S2302).

If the predetermined size of the encoded data has not been transmitted (step S2302:N), processing returns to step S2302.

If the predetermined size of the encoded data has not been transmitted in a predetermined time period (step S2302: time out), processing ends.

If the predetermined size of the encoded data has been transmitted (step S2302:Y), the length monitoring unit 2201 adds 4 to the counter (step S2303).

The length monitoring unit 2201 checks whether the value in the counter is the value corresponding to the size of a piece of the block data (1472) (step S2304).

If the value in the counter is not the value corresponding to the size of a piece of the block data (step S2304:N), processing returns to step S2302.

If the value in the counter is the value corresponding to the size of a piece of the block data (step S2304:Y), the length supervisor 2201 transmits a notification to the divided data storage unit 2202 indicating that storage of the block size of the encoded data has been completed (step S2305), and processing returns to step S2301.

Divided Data Storage Unit

The following describes the operations of the divided data storage unit 2202.

Figure 24:
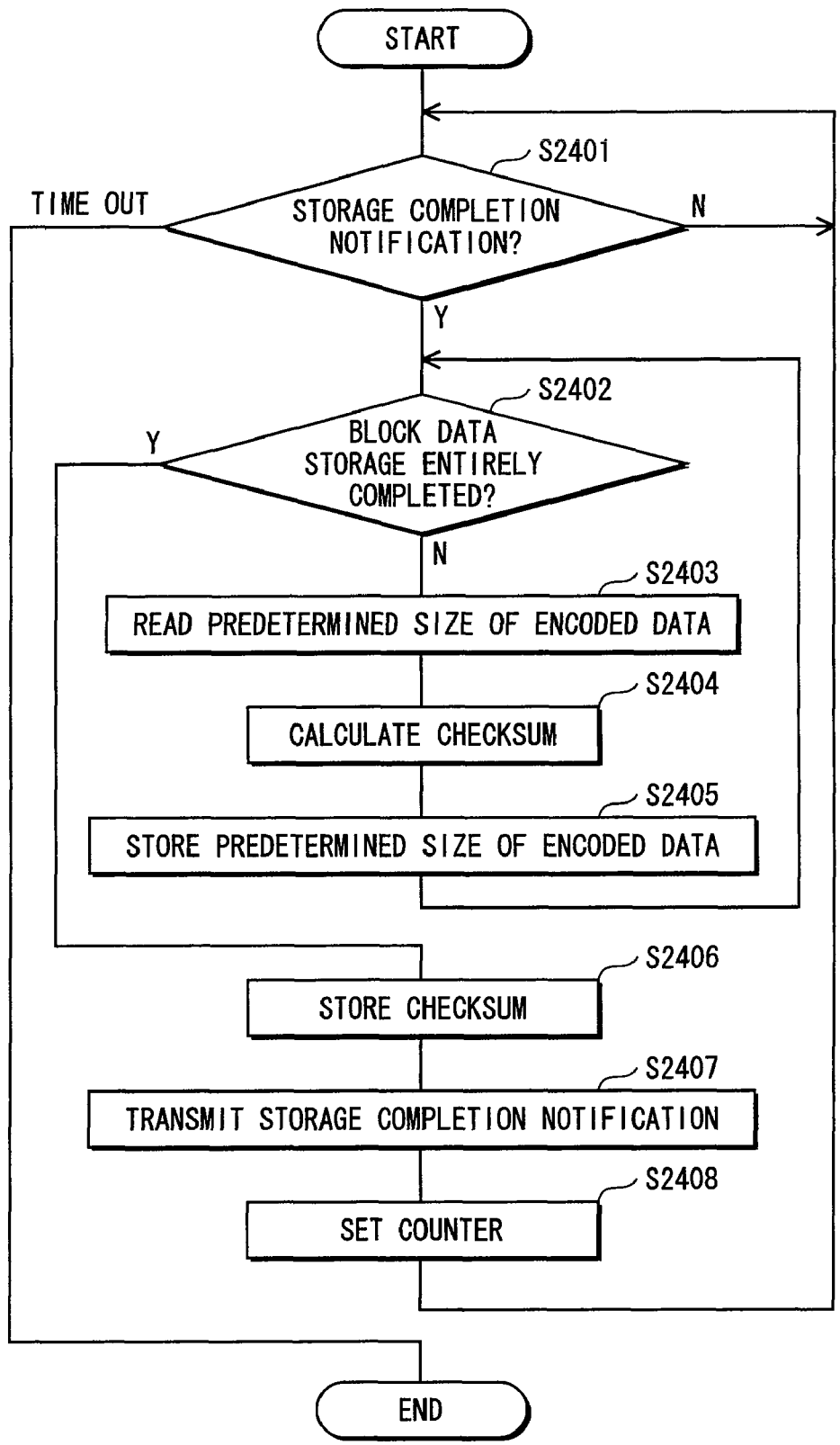
FIG. 24 is a flowchart showing processing of a divided data storage unit 2202.

FIG. 24 is a flowchart showing operations of the divided data storage unit 2202.

The transfer unit 205 of the divided data storage unit 2202 checks whether a notification has been received, from the length monitoring unit 2201 via the control unit 207 of the divided data storage unit 103, indicating that storage of the block size of the encoded data has been completed (step S2401).

If the notification has not been received (step S401:N), processing returns to step S2401.

If the notification has not been received in a predetermined time period (step S2401: time out), the processing ends.

If the notification has been received (step S2401:Y), step S2402 is performed.

Since processing in steps S2402 to S2408 is the same as processing performed by the divided data storage unit 103 pertaining to embodiment 1 in steps S503 to S509 shown in FIG. 5, description thereof is omitted.

Timing Chart

The following describes the timings of operations of the divided data storage unit 2202.

Figure 25:
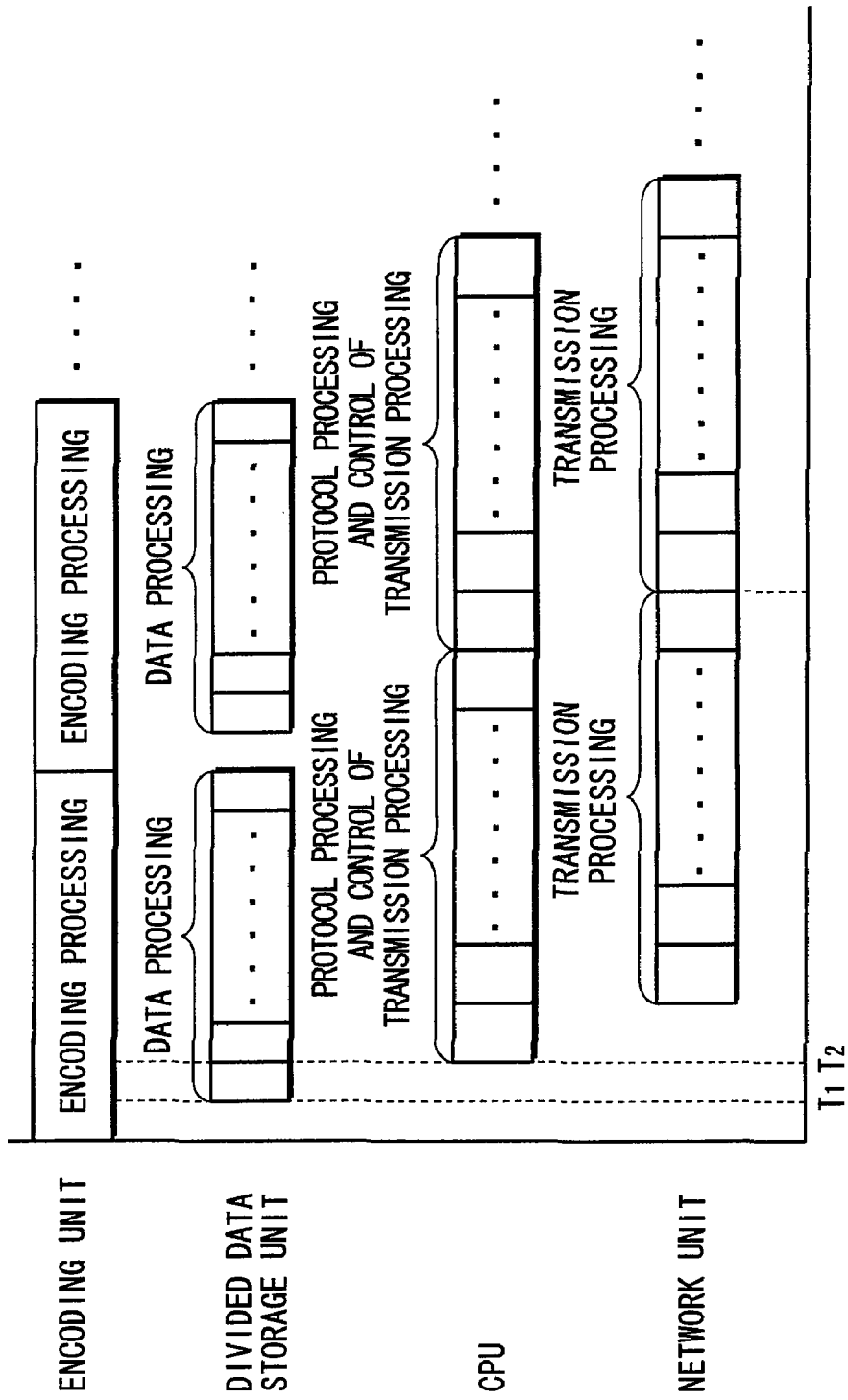
FIG. 25 is a timing chart showing processing of various units in the communication apparatus 2200.

FIG. 25 is a timing chart showing processing of various units in the communication apparatus 2200.

In the following description, the encoding unit 102 stores one frame worth of encoded data in the encoded data area 301a.

Note that since the operation timings of the encoding unit 102, the CPU 104, and the network unit 105 are the same as the operation timings indicated in the timing chart of FIG. 7, description thereof is omitted.

T1 is a timing at which the value in the counter of the length monitoring unit 2201 is the value corresponding to the size of a piece of the block data (1472), the divided data storage unit 2202 receives a notification from the length monitoring unit 2201 indicating that storage of the block data size of the encoded data has been completed, and processing starts.

From T1 to T2, the divided data storage unit 2202 performs processing according the flowchart of FIG. 24, and performs storage of one piece of block data and the checksum of the block data. Hereinafter, by repeating the same processing, one frame worth of encoded data can be processed.

Variation 4

Overview

The communication apparatus pertaining to variation 4 monitors a bit pattern of the encoded data that is stored in the encoded data area 301a or the encoded data area 301b of the external memory 110 by the encoding unit 102, and causes the divided data storage unit pertaining to variation 4 to perform processing each time the predetermined bit pattern is detected.

For example, in MPEG-4 for RTP communication, guidelines have been formulated for sending MPEG-4 encoded data upon detecting a resynchronization marker. Setting a resynchronization marker as a predetermined bit pattern enables transmitting encoded MPEG-4 data in accordance with the guidelines.

Also, upon detecting the predetermined bit pattern, the communication apparatus pertaining to embodiment 4 stores the encoded data following the predetermined bit pattern in an area starting with a predetermined byte number boundary, for example, a 4-byte boundary, in the encoded data area 301 or 301b of the external memory 110. This enables ensuring byte alignment of the encoded data.

Structure

Figure 26:
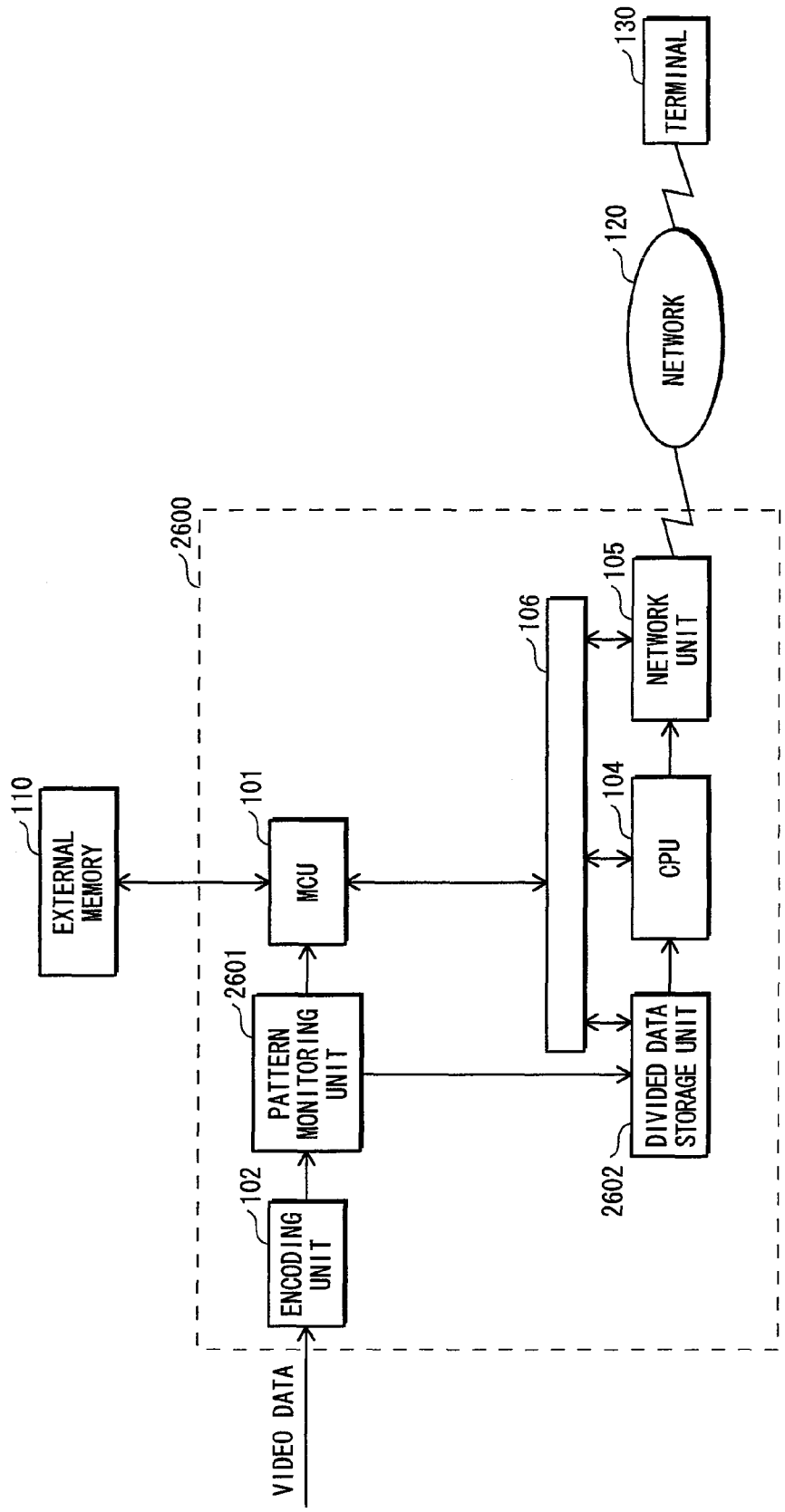
FIG. 26 shows a structure of a communication apparatus 2600 pertaining to variation 4.

FIG. 26 shows the structure of the communication apparatus 2600 pertaining to variation 4.

As shown in FIG. 26, the communication apparatus 2600 includes the MCU 101, the encoding unit 102, the CPU 104, the network unit 105, the internal bus 106, the pattern monitoring unit 2601, and the divided data storage unit 2602.

Since the MCU 101, the encoding unit 102, the CPU 104, the network unit 105, and the internal bus 106 are the same as in the communication apparatus 100 pertaining to embodiment 1, description thereof is omitted.

Note that in the present embodiment, even after completing storage of the encoded data in the external memory 110, the encoding unit 102 does not transmit a storage completion notification to the divided data storage unit 2602.

The pattern monitoring unit 2601 is a circuit that monitors the bit patterns of the encoded data being stored by the encoding unit 102 in the encoded data areas 301a and 301b of the external memory 111, and upon detecting a predetermined bit pattern, such as a bit pattern of the MPEG-4 resynchronization marker, that has been set in advance by the user of the communication apparatus 2600, etc., notifies the divided data storage unit 2602.

Specifically, the pattern monitoring unit 2601 includes a FIFO buffer, a memory, and a comparison circuit, and the memory stores data having the predetermined bit pattern that is targeted for extraction.

The pattern monitoring unit 2601 stores encoded data transmitted by the encoding unit 102 in the FIFO buffer in units of a predetermined size (4 bytes), and sequentially compares the encoded data stored in the FIFO buffer and data having the predetermined bit pattern stored in the memory.

If the predetermined bit pattern is detected as a result of the comparison, the pattern monitoring unit 2601 transmits a notification to the divided data storage unit 2602 indicating that the predetermined bit pattern has been detected.

Also, the pattern monitoring unit 2601 sequentially transmits the encoded data pieces on which the comparison has been performed in units of the predetermined size (4 bytes) from the FIFO buffer, stores the encoded data pieces in the encoded data storage unit 301a or 301b of the external memory 110, and transmits a notification to the divided data storage unit 2602 indicating that the predetermined size (4 bytes) of the encoded data has been stored.

However, if the predetermined bit pattern is detected, the pattern monitoring unit 2601 stores the encoded data following the predetermined bit pattern, not in contiguous areas of the encoded data storage units 301a or 301b, but rather in an area starting with a predetermined byte number boundary, for example, a 4-byte boundary.

At this time, predetermined padding data is inserted in a free area between encoded data before the predetermined bit pattern and encoded data after the predetermined bit pattern. The predetermined padding data is composed of, for example, stuffed bits (where the first bit is 0 and later bits are 1).

The divided data storage unit 2602 is basically the same circuit as the divided data storage unit 2202 of variation 3. However, the divided data storage unit 2602 differs from the divided data storage unit 2202 in reading encoded data of the predetermined size (4 bytes) stored in the encoded data area 301a or 301b of the external memory 110 each time a notification is received from the pattern monitoring unit 2601 indicating that the predetermined size (4 bytes) of encoded data has been stored.

Also, the divided data storage unit 2602 differs from the divided data storage unit 2202 in storing the checksum in the first area 311 of the external memory 110 each time a notification is received from the pattern monitoring unit 2601 indicating that the predetermined bit pattern has been detected.

The following specifically describes the divided data storage unit 2602.

Although the structure of the divided data storage unit 2602 is basically the same as the structure of the divided data storage unit 103 shown in FIG. 2, the divided data storage unit 2602 differs with respect to the transfer unit of DTC and the control unit, described below.

Upon receiving a notification from the pattern monitoring unit 2601 via the control unit of the divided data storage unit 2602 indicating that the predetermined size (4 bytes) of encoded data has been stored, the transfer unit of the divided data storage unit 2602 reads the predetermined size (4 bytes) of the encoded data from the encoded data area 301a or 301b of the external memory 110 to the buffer 201 of the divided data storage unit 2602, and in this respect differs from the transfer unit 205 of the divided data storage unit 2202.

Also, the transfer unit of the divided data storage unit 2602 differs from the transfer unit 205 of the divided data storage unit 2202 in that, upon receiving the notification from the pattern monitoring unit 2601 via the control unit of the divided data storage unit 2602 indicating that the predetermined bit pattern has been detected, the transfer unit of the divided data storage unit 2602 reads the checksum from the checksum calculation unit 202 and stores the checksum in the first area 311 of the external memory 110 indicated by the write address value set in the counter 203.

The control unit of the divided data storage unit 2602 is basically the same circuit as the control unit 207 of the divided data storage unit 2202. However, upon receiving a notification from the pattern monitoring unit 2601 indicating that the predetermined size (4 bytes) of encoded data has been stored, or a notification from the pattern monitoring unit 2601 indicating that the predetermined bit pattern has been detected, the control unit of the divided data storage unit 2602 transfers the notification to the transfer unit of the divided data storage unit 2602.

Data

Since the data used by the communication apparatus 2600 is the same as the data used by the communication apparatus 100 of embodiment 1, description thereof is omitted.

Operation

The following describes the operations of the communication apparatus 2600 that processes the above data and has the structure described above.

Divided Data Storage Unit

First, the operation of the divided data storage unit 2602 is described.

Figure 27:
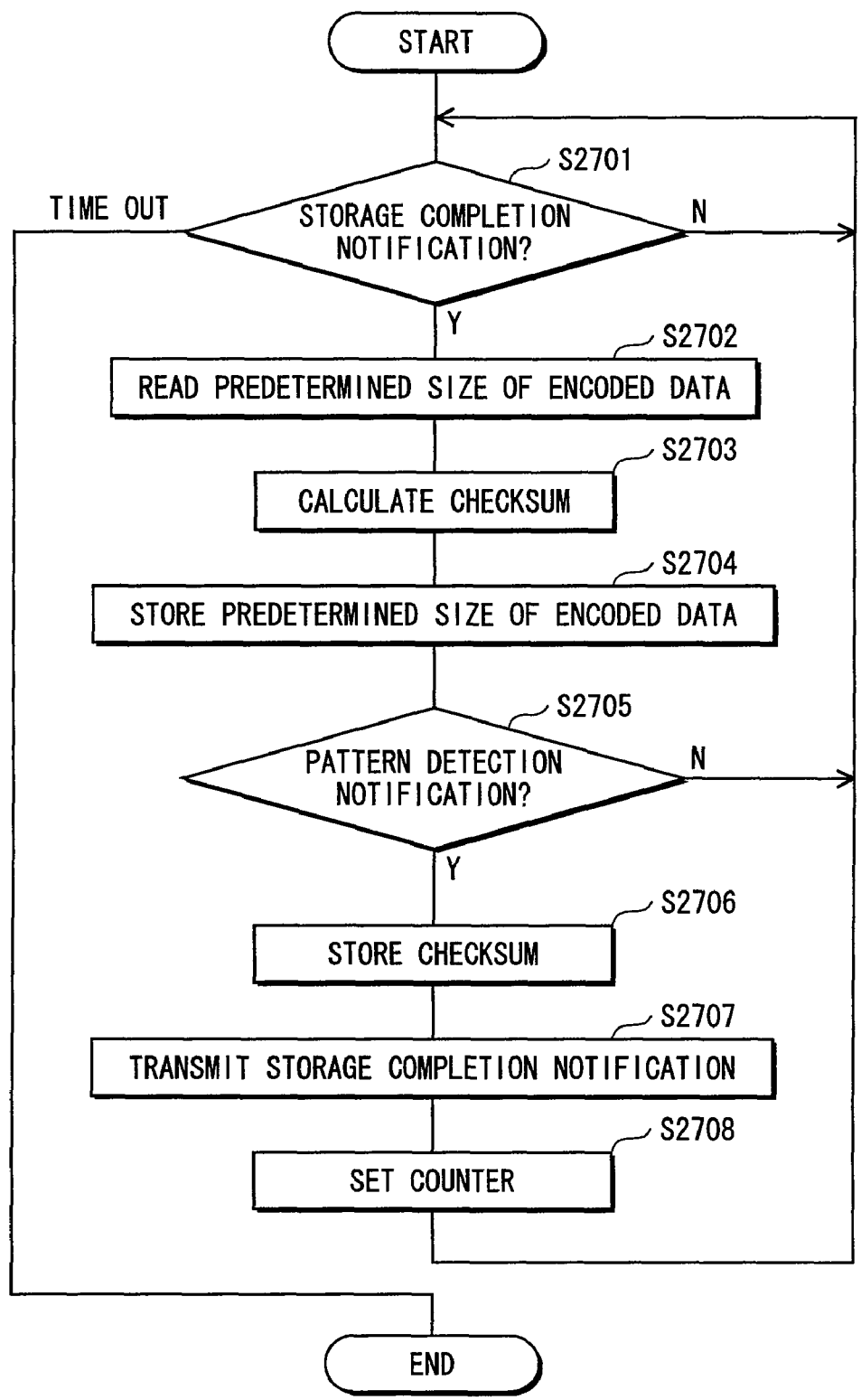
FIG. 27 is a flowchart showing processing of a divided data storage unit 2602.

FIG. 27 is a flowchart showing the operation of the divided data storage unit 2602.

Note that in the following description, the data having the predetermined bit pattern is detected at a shorter interval than the size of a piece of the block data (1472 bytes).

The transfer unit of the divided data storage unit 2602 checks whether a notification has been received from the pattern monitoring unit 2601 via the control unit of the divided data storage unit 2602 indicating that the predetermined size of encoded data (4 bytes) has been stored (step S2701).

If the notification indicating that the predetermined size of encoded data has been stored has not been received (step S2701:N), processing returns to step S2701.

If the notification has not been received in a predetermined period of time (step S2701: time out), processing ends.

If the notification has been received (step S2701:Y), processing proceeds to step S2702.

Since the processing from steps S2702 to S2704 is the same as the processing performed by the divided data storage unit 2202 in variation 3 shown FIG. 24 in steps S2403 to S2405, description thereof is omitted.

The transfer unit of the divided data storage unit 2602 checks whether a notification has been received from the pattern monitoring unit 2601 via the control unit of the divided data storage unit 2602 indicating that the predetermined bit pattern has been detected (step S2705).

If the notification has not been detected (step S2705:N), processing returns to step S2701.

If the notification is received (step S2705:Y), processing proceeds to step S2706.

Since processing in steps 2706 to S2708 is the same as the processing performed by the divided data storage unit 2202 pertaining to variation 1 in steps S2406 to S2408 shown in FIG. 24, description thereof is omitted.

Timing Chart

The following describes the timings of operations of the divided data storage unit 2602.

Figure 28:
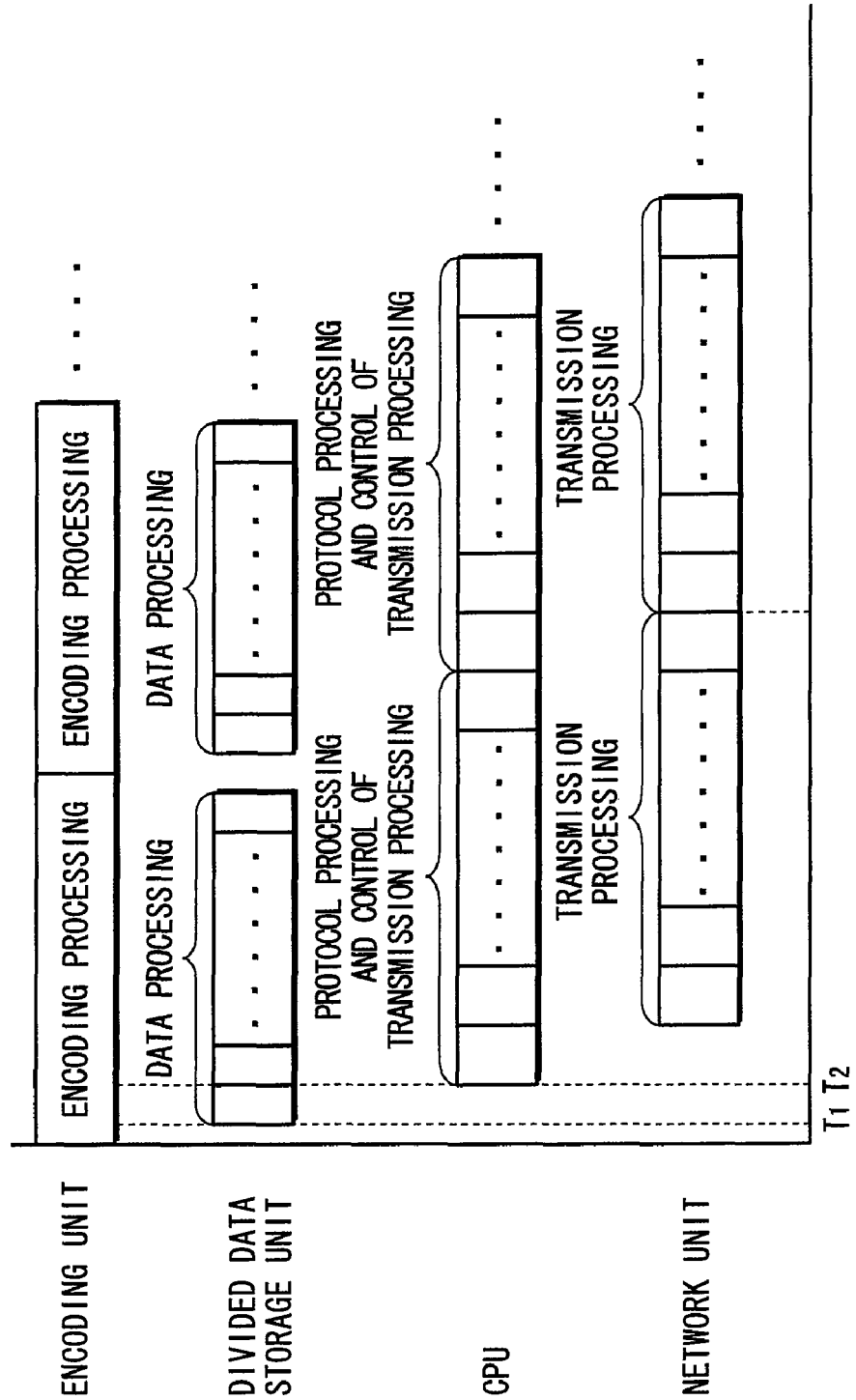
FIG. 28 is a timing chart showing processing of various units in the communication apparatus 2600.

FIG. 28 is a timing chart showing the operation of various units in the communication apparatus 2600.

Note that since the operation timings of the encoding unit 102, the CPU 104, and the network unit 105 are the same as the operation timings shown in the timing chart of FIG. 7, description thereof is omitted.

T1 is a timing at which the divided data storage unit 2602 receives a notification from the pattern monitoring unit 2601 indicating that the predetermined size (4 bytes) of encoded data has been stored, and starts processing.

From T1 to T2, the divided data storage unit 2602 performs processing according to the flowchart in FIG. 27, reads the encoded data of the predetermined size (4 bytes) from the encoded data area 301 of the external memory 110 to the buffer 201 each time a notification is received indicating that the predetermined size (4 bytes) of encoded data has been stored, calculates a checksum, and stores the predetermined size (4 bytes) of the encoded data in the first area 311 of the external memory 110.

T2 is a timing at which the pattern monitoring unit 2601 detects the predetermined bit pattern, the divided data storage unit 2602 receives a notification from the pattern monitoring unit 2601 indicating that the predetermined bit pattern has been detected, and stores the checksum in the first area 311 of the external memory 110.

In variation 4, the encoded data is stored in the first area 311 of a different packet data area each time the predetermined bit pattern is detected, and in the end, the network unit 105 can transmit the encoded data as different pieces of packet data.

Hereinafter, repeating the processing from T1 to T2 enables processing one frame worth of encoded data.

Supplementary Remarks

Although described based on the above embodiments, the communication apparatus of the present invention is of course not limited to such embodiments. Variations such as the following are also included in the present invention.

(1) The encoding unit 102 of embodiment 1 is a circuit that generates encoded data by compression encoding video data input from outside the communication apparatus 100 on a frame-by-frame basis. Here, the encoding unit 102 may be able to generate encoded data of a designated size. Specifically, by providing an encoding setting unit that is a circuit that designates a size of the encoded data, the encoding setting unit can designate the size of the encoded data to the encoding unit 102, and the encoding unit 102 can generate the encoded data of the size designated by the encoding setting unit.

The user of the communication apparatus may designate the size of the encoded data to the encoding setting unit, or the encoding setting unit may detect a transmission speed on the network 120, and designate the size in accordance with the detected transmission speed.

(2) The network unit 105 of embodiment 1 may be able to transmit packet data not only when the network 120 is a wired network, but also when the network 120 is a wireless network.

(3) Although the packet data areas of embodiment 1 have a structure in which the first area 311 is arranged following the second area 312, provided that the first area 311 and the second area 312 are arranged sequentially, the second area 312 may be arranged following the first area 311.

(4) Although embodiment 1 describes an exemplary case in which the video data is sent with use of UDP, the video data may also be sent with use of TCP (Transmission Control Protocol), and in this case, the checksum stored in the first area 311 is used as the checksum in the TCP header.

When the packet data is transmitted by TCP, if the communication apparatus 100 does not receive a response (an ACK packet) indicating that the packet data has been received in a predetermined time period (for example, 30 seconds) after the packet data transmission from the terminal 130 that is the transmission destination of the packet data, the CPU 104 of the communication apparatus 100 judges that the transmitted packet data has not been received by the terminal 130, and retransmits the packet data.

To enable retransmitting the packet data, the CPU 104 of the communication apparatus 100 causes the block data that constitutes the packet data targeted for retransmission to be copied from the network data area 302*a* or 302*b* of the external memory 110 to another storage area (hereinafter referred to as "retransmission area", and retransmits the packet data with use of the block data stored in the retransmission area.

This enables maintaining high-speed packet data transmission processing, since even when retransmitting the packet data is necessary, the divided data storage unit 103 and the CPU 104, in later processing, are not required to skip the packet data areas in which data constituting the packet data targeted for retransmission is stored.

Note that although an example of sending video data with use of TCP is used in the above description of processing for packet data transmission, the same processing is performed when a protocol other than TCP premised on the retransmission of packet data is used, or when retransmission of the packet data is performed by an application.

Also, although the CPU 104 performs processing for retransmitting the packet data in the above description, the processing may also be performed by specialized hardware.

(5) In embodiment 1, the transfer unit 205 of the DTC 206 sequentially reads the encoded data from the encoded data areas indicated by the read address values set in the counter 203, and stores the read encoded data in the network data areas indicated by the write address values set in the counter 203. However, a plurality of data pieces may be continuously transmitted as a group upon a one-time designation of an address value, as so-called burst transmission.

(6) Although the address control unit 802 of embodiment 2 designates the starting address values of the packet data areas, the address control unit 802 may instead designate address values indicating the first areas 311 of the packet data areas to the divided data storage unit 803.

In this way, the divided data storage unit 803 does not need to calculate address values indicating the first areas 311 from the starting address values of the designated packet data areas, thus further enabling high speed processing.

(7) Although in the description of embodiment 2, the address control unit 802 has an internal CPU, the function of the address control unit 802 may be realized instead by the CPU 804.

(8) Although in the description of variation 1, header information is arranged after the address value in the second area 1412 of the packet data areas, the reverse order may also be used.

(9) Although the offset control unit 2201 of variation 1 has an internal CPU in the description of variation 1, the function of the offset control unit 2201 may also be realized by the CPU 104.

(10) Although the pattern monitoring unit 2601 of variation 4 has been described as detecting one bit pattern, the pattern monitoring unit 2601 may also be able to detect a plurality of bit patterns.

(11) Although in variation 4, the data having the predetermined bit pattern is detected at an interval that is shorter than the size of a piece of the block data (1472 bytes), if detected at an interval that exceeds the size of a piece of the block data, the divided data storage unit 2602 may store the checksum each time storage of the block data to the first area 311 of the external memory 110 is completed.

(12) Although in embodiment 1, header information 400 is generated by causing the CPU 104 to execute a program, the header information may be generated by providing specialized hardware (hereinafter referred to as a "header assignment circuit") that generates the header information 400, and using the specialized hardware. Causing the header assignment circuit that is specialized hardware to generate the header information 400 reduces the load on the CPU 104.

Also, headers included in the header information 400 generated by the header assignment circuit (a UDP header 422, etc.), may be selected arbitrarily layer by layer. In this way, the header information may be generated in accordance with the protocol used by the communication apparatus 100.

In order to achieve this, for example, headers may be stored in the internal memory of the communication apparatus 100 in correspondence with various protocols, and for each layer, the header assignment circuit may be caused to select and combine headers corresponding to the protocols used by the communication apparatus 100, thus generating header information for final transmission of packet data.

For example, if the packet data is transmitted with use of TCP, header information is generated by selecting a combination of a MAC header, an IP header, and a TCP header.

Note that in addition to a case of the user of the communication apparatus 100 etc. setting the protocol used by the communication apparatus 100 in advance, the protocol used may be changed automatically according to the load on the CPU 104, for example. In such a case, the header assignment circuit receives a change signal from the CPU 104 indicating the change of protocol, and changes the content of the header information to be generated in accordance with the change signal.

(13) Since the checksum is included in the header information 400 in embodiment 1, the header information 400 cannot be entirely generated until after the checksum has been generated by the divided data storage unit 103. In view of this, the header assignment circuit may generate a portion of the header information 400 that can be generated in advance without use of the checksum (hereinafter referred to as "partial header information"), and the CPU 104 may generate a portion that is generated with use of the checksum.

Specifically, for example, "type", "source MAC address", and "destination MAC address" are included in the MAC header, and since such content can be created in advance independently of the content of the checksum, the header assignment circuit may generate this as partial header information.

In this way, since the CPU 104 only generates a portion of the header information 400 including the checksum, the load on the CPU 104 can be reduced. Also, shortening the time taken by the CPU 140 to generate the header information 400 enables higher speed transmission of the packet data.

Also, since the partial header information can be generated in advance without including the checksum or the like, the checksum generated by the divided data storage unit 103 may reflect the content of the partial header information and the block data, and furthermore, the checksum may also be generated according to the partial header information only. Specifically, the data that is to be reflected can be selected when the checksum is generated.

(14) The structure of embodiment 1 may be divided into a chip composed of the divided data storage unit 103, the CPU 104, and the network unit 105, and a chip including the encoding unit 102, or may be a single chip.

(15) In embodiment 1, the frame structure of the packet data 400 is described as being compliant with IEEE 802.3 standards. However, the present invention is not limited to this, and IEEE 802.11a/b/g may be used in the case of a wireless LAN, for example.

(16) Although embodiment 1 describes an exemplary case in which the bus width in the external memory is 4 bytes, the bus width is of course not limited to this. Also, there are no particular restrictions on the relationship between the bus length and the processing unit of the checksum calculation unit 202 of the divided data storage unit 103.

Specifically, although the checksum operation unit 202 is described as calculating a checksum that is a total value of all numerical values when 2 bytes of encoded data is considered as numerical values, and the bus width is described as 4 bytes, the bus width is not limited to being twice the processing unit of the checksum calculation unit 202.

(17) Although the storage area of the external memory 110 in embodiment 1 is described as having two each of encoded data areas and network data areas, the present invention is not limited to this, and there may be only one of each type of area.

Also, although the encoded data area 301*a*, the network data area 302*a*, the encoded data area 301*b*, and the network data area 302*b* are described as being arranged in that order in the storage area of the external memory 110, the following order may also be used: the encoded data area 301*a*, the encoded data area 301*b*, the network data area 302*a*, and the network data area 302*b*.

This enables the encoding unit 102 to store the encoded data in areas having consecutive addresses.

(18) Although the pattern monitoring unit 2601 of the communication apparatus 2600 is described as correcting byte alignment by padding in variation 4, byte alignment may also be corrected by data copying without padding. Specifically, the pattern monitoring unit 2601 stores the encoded data stored in the FIFO buffer sequentially in the encoded data storage area 301*a* or 301*b* of the external memory 110. When the predetermined bit pattern is detected, if data after the detected predetermined bit pattern is not stored in an area having the predetermined alignment boundary as a start, the data is copied to the area having the predetermined alignment boundary as the start.

(19) Although the embodiments describe exemplary cases in which the operations of the divided data storage unit, the CPU, the address control unit, the offset control unit, and the length control unit end upon a time out, the present invention is not limited to this, and processing in the embodiments may also end upon powering off the communication apparatus, occurrence of an error, or a predetermined operation by the user.

(20) Although the embodiments describe exemplary cases in which the communication apparatus transmits encoded data that is compression encoded video data, the data to be transmitted is of course not limited to this.

(21) Although the embodiments describe exemplary cases in which the communication apparatus transmits the video data received from an external source to the terminal 130 via the network 120, the present invention is not limited to this. For example, as shown in FIG. 29, the communication apparatus of the present invention may be applied to a digital camera 2900.

Figure 29:
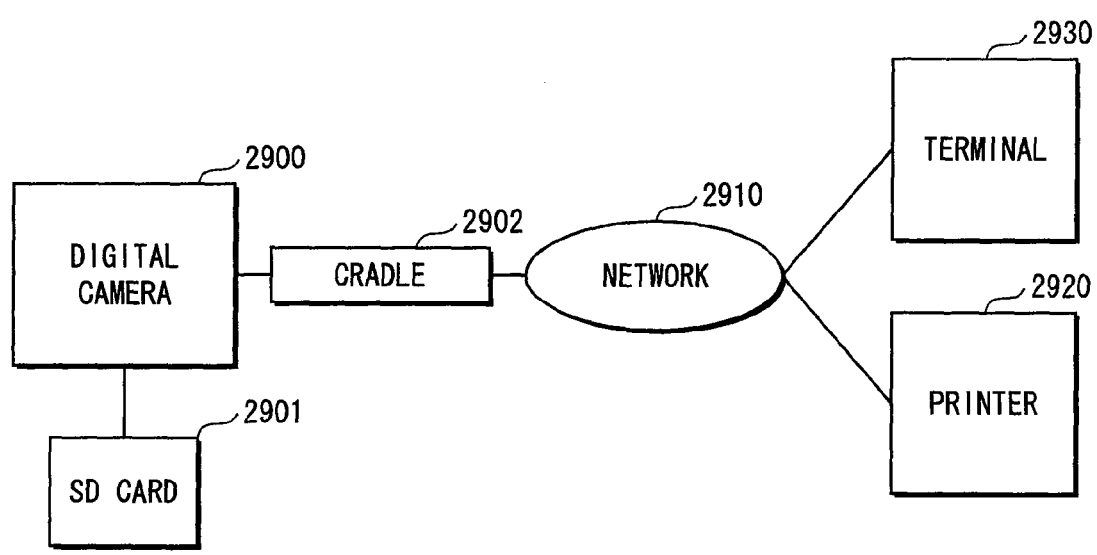
FIG. 29 illustrates an exemplary application of the communication apparatus of the present invention.

As shown in FIG. 29, an SD card 2901 is inserted in the digital camera 2900, which is connected to a wired or wireless network 2910 via a cradle 2902.

In addition to the general functions of a digital camera, the digital camera 2900 has the functions of the communication apparatus of the present invention, storing captured image data on the SD card 2901 and sequentially transmitting the image data stored on the SD card 2901 to a printer 2920 and/or a terminal 2930.

The digital camera 2900 transmits the image data stored on the SD card 2901 with use of the functions of the present invention, thereby realizing high-speed send processing.

Note that although the digital camera 2900 is described above as having the SD card 2901 inserted therein, another recording medium such as a memory stick may also be used. Also, although the digital camera 2900 is described as being connected to the network 2910 via the cradle 2902, the digital camera is not limited to this, and provided there is an interface for connecting to the network, for example, a LAN adapter that can be connected to the digital camera 2900 by USB may be used.

What is claimed is:

1. A communication apparatus that sequentially transmits a plurality of pieces of packet data over a network, each piece of packet data including a piece of block data, the communication apparatus comprising:
 a storage circuit configured to (i) generate a plurality of pieces of verification data in one-to-one correspondence with the plurality of pieces of block data, each piece of verification data reflecting content of the corresponding piece of block data which is data having a first size, and (ii) store each pair of a piece of verification data and a corresponding piece of block data in a different one of a plurality of areas having a second size in an external memory;
 a packet control unit that includes a CPU and is configured to cause the CPU to execute a program to, for each piece of block data stored in the external memory by the storage circuit, read the piece of verification data corresponding to the piece of block data, generate a piece of header information including the read piece of verification data, and perform control to transmit a piece of packet data including the generated piece of header information and the piece of block data corresponding to the piece of verification data included in the generated piece of header information; and
 a network unit configured to sequentially transmit each piece of packet data according to the control performed by the packet control unit, wherein
 the storage circuit that generates the plurality of pieces of verification data and stores the plurality of pieces of verification data and the corresponding plurality of pieces of block data and the CPU that executes the program for generating the plurality of pieces of header information and performing control to sequentially transmit each piece of packet data operate in parallel.

2. The communication apparatus of claim 1, wherein
 first areas that are the areas having the second size in the external memory are arranged at an address value interval that is a sum of the second size and a predetermined value, and
 the program is for, for each piece of block data stored in each of the first areas, reading the piece of verification data corresponding to the piece of block data, generating the piece of header information, storing the piece of header information in a second area which is an area that is contiguous to one of the first areas and is a same size as the predetermined value, and performing control to sequentially transmit the piece of packet data including the piece of header information stored in the second area and the piece of block data corresponding to the piece of verification data stored in one of the first areas.

3. The communication apparatus of claim 1, further comprising:

an address control unit configured to ensure a plurality of packet data areas, each including a first area that is a free one of the areas having the second size in the external memory and a second area that is contiguous with one of the first areas and is a predetermined address value worth of area, and designate a plurality of address values indicating the packet data areas in one-to-one correspondence, wherein the storage circuit stores each pair of the piece of block data and the corresponding piece of verification data in a different one of the first areas of the packet data areas indicated by the address value designated by the address control unit, and the program is for, for each packet data area indicated by the address value designated by the address control unit, reading the piece of verification data corresponding to the piece of block data, generating the piece of header information, storing the piece of header information in the second area, and performing control to sequentially transmit the piece of packet data including the generated piece of header information and the piece of block data stored in the packet data area.

4. The communication apparatus of claim 1, further comprising:

an address control unit configured to ensure a plurality of packet data areas, each including a first area that is a free one of the areas having the second size in the external memory and a second area that is contiguous with one of the first areas and is a predetermined address value worth of area, and designate a plurality of address values indicating the packet data areas in one-to-one correspondence; and an offset control unit configured to, for each address value designated by the address control unit, store a subsequently designated address value in the second area of one of the packet data areas indicated by the each address value, wherein the storage circuit, for each second area of the packet data areas, stores the piece of block data and the piece of verification data corresponding to the piece of block data in one of the first areas of one of the packet data areas indicated by the address value stored in the second area, and the program is for, for each packet data area indicated by the address value stored in the second area of one of the packet data areas, reading the piece of verification data stored in one of the first areas, generating the piece of header information, storing the piece of header information in the second area, and performing control to sequentially transmit the piece of packet data including the piece of header information and the piece of block data stored in one of the packet data areas.

5. The communication apparatus of claim 1, further comprising:

an MMU (Memory Management Unit) configured to store a logical address value in correspondence with a physical address value indicating a free area in the external memory, and convert the logical address value to the corresponding physical address value if an access to the external memory designates the logical address value, wherein the storage circuit designates a logical address value when storing the piece of block data and the piece of verification data corresponding to the piece of block data in the area having the second size, and the program is further for designating the logical address value when reading the piece of verification data from one of the areas having the second size.

6. The communication apparatus of claim 1, further comprising:

an encoded data storage unit configured to, upon receiving an input of encoded data constituted from video or audio data that has been compression encoded in predetermined units, store the encoded data in the external memory; and a length monitoring unit that monitors a size of the encoded data stored in the external memory by the encoded data storage unit, and each time a first size worth of the encoded data is stored, transmits a read instruction signal that instructs the storage circuit to read the first size worth of the encoded data, wherein each piece of the block data is a different first size worth of the encoded data read from the external memory each time the storage circuit receives the read instruction signal from the length monitoring unit.

7. The communication apparatus of claim 1, further comprising:

a pattern monitoring unit configured to, upon receiving an input of encoded data constituted from video data or audio data that has been compression encoded in predetermined units, (i) store the encoded data in the external memory, (ii) detect a predetermined bit pattern in the encoded data during storage, and (iii) for each detected predetermined bit pattern, transmit a detection signal to the storage circuit indicating that the predetermined bit pattern has been detected, wherein upon receiving the detection signal from the pattern monitoring unit, the storage circuit reads the encoded data stored in the external memory until reception of a next detection signal, and processes the read encoded data as a piece of block data.

8. The communication apparatus of claim 7, wherein the pattern monitoring unit, upon detecting the predetermined bit pattern in the encoded data, stores the encoded data after the detected bit pattern in an area whose start is a predetermined address boundary in the external memory.

9. The communication apparatus of claim 1, further comprising:

a header assignment circuit configured to, in place of the packet control unit, for each piece of block data stored in the external memory by the storage circuit, read the piece of verification data corresponding to the piece of block data, and generate the piece of header information including the read piece of verification data; and a transmission control unit that includes a CPU and is configured to cause the CPU to execute a program to, for each piece of header information generated by the header assignment circuit, perform control to transmit the piece of packet data including the piece of header information generated by the header assignment circuit and the piece of block data corresponding to the piece of verification data included in the header information.

10. The communication apparatus of claim 9, wherein
the header assignment circuit generates each piece of header information by selecting an arbitrary header for each layer in a protocol hierarchy used in data transmission.

11. The communication apparatus of claim 1, further comprising:
a header assignment circuit that, in place of the packet control unit generating the header information, for each piece of block data stored by the storage circuit in the external memory, generates a piece of partial header information which is a portion of header information that can be generated without use of the piece of verification data; and
a transmission control unit that includes a CPU and is configured to cause the CPU to execute a program to, for each piece of block data stored in the external memory by the storage circuit, read the piece of verification data corresponding to the piece of block data, generate a piece of header information including the read piece of verification data and the piece of partial header information corresponding to the piece of block data, and perform control to transmit the packet data including the piece of header information and the piece of block data corresponding to the piece of verification data.

12. The communication apparatus of claim 11, wherein
the storage circuit generates the plurality of pieces of verification data, each piece of verification data reflecting content of the corresponding piece of block data and the piece of partial header information corresponding to the piece of block data.

13. The communication apparatus of claim 1, further comprising:

an encoding setting unit configured to designate a data size of encoded data for compression encoding video or audio data in predetermined units to constitute encoded data; and
an encoding unit configured to, upon receiving an input of the video or audio data, compression encode the video or audio data in predetermined units in accordance with the data size designated by the encoding setting unit, and store the encoded data in the external memory.

14. The communication apparatus of claim 1, wherein
the external memory has a first network data area and a second network data area that are logically divided from each other, and
the plurality of areas having the second size are alternately arranged in the first network data area and the second network data area each time an input is received of encoded data constituted from video or audio data that has been compression encoded in predetermined units.

15. The communication apparatus of claim 14, wherein
communication is performed premised on a possibility of retransmission,
the external memory has a retransmission area that stores a piece of block data that constitutes a piece of packet data that is possibly required for retransmission, and
for each piece of packet data, if a response from a transmission destination of the piece of packet data indicating that the piece of packet data has been received is not received in a predetermined time period after the network unit transmits the piece of packet data, the packet control unit causes the CPU to execute a program that transfers the piece of block data that constitutes the piece of packet data for which the response has not been received to the retransmission area.

* * * * *